United States Patent
Hsing et al.

(10) Patent No.: US 12,184,377 B2
(45) Date of Patent: Dec. 31, 2024

(54) METHOD FOR ANTENNA SELECTION OF USER EQUIPMENT

(71) Applicant: MEDIATEK Inc., Hsinchu (TW)

(72) Inventors: Da-Chun Hsing, Hsinchu (TW); Wei-Yao Chen, Hsinchu (TW); Nien-En Wu, Hsinchu (TW); Chih-Wei Chen, Hsinchu (TW); Yabo Li, Hsinchu (TW); Jiaxian Pan, Hsinchu (TW); Chong-You Lee, Hsinchu (TW); Wei-Jen Chen, Hsinchu (TW); Chih-Yuan Lin, Hsinchu (TW); Jianwei Zhang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 50 days.

(21) Appl. No.: 18/147,732

(22) Filed: Dec. 29, 2022

(65) Prior Publication Data

US 2023/0216571 A1    Jul. 6, 2023

Related U.S. Application Data

(60) Provisional application No. 63/296,000, filed on Jan. 3, 2022.

(30) Foreign Application Priority Data

Dec. 26, 2022  (CN) .......................... 202211676965.3

(51) Int. Cl.
  *H04B 7/0413*   (2017.01)
  *H04B 7/06*    (2006.01)
(52) U.S. Cl.
  CPC ......... *H04B 7/0691* (2013.01); *H04B 7/0608* (2013.01)

(58) Field of Classification Search
  CPC .... H04B 7/086; H04B 7/0617; H04B 7/0854; H04B 17/345; H04B 7/0417; H04B 7/0408; H04B 7/0413; H04B 7/0632; H04W 16/28; H04W 88/06; H04W 72/23; H04W 24/02; H04W 52/146; H04W 24/10; H04W 48/16; H04W 36/14; H04W 52/42;
  (Continued)

(56) References Cited

U.S. PATENT DOCUMENTS 7,565,172 B2 * 7/2009 Yoshida ............... H01Q 3/2605
                                                  375/150
2005/0090205 A1   4/2005 Catreux-Erceg
                (Continued)

OTHER PUBLICATIONS

TW Office Action dated Jul. 26, 2023 in Taiwan application No. 111150650.

*Primary Examiner* — Eva Y Puente
(74) *Attorney, Agent, or Firm* — McClure, Qualey & Rodack, LLP

(57) ABSTRACT

The invention provides a method for antenna selectin of a user equipment (UE). The UE may comprise a plurality of antennas. The method may comprise calculating one or more quality evaluations respectively associated with one or more first antenna subsets, and selecting one of the one or more first antenna subsets according to the one or more quality evaluations. Each antenna subset may include one or more of the plurality of antennas. Each quality evaluation may be calculated under a condition that the antenna(s) included in the associated antenna subset is (are) used to communicate.

19 Claims, 14 Drawing Sheets

(58) Field of Classification Search
CPC ... H04L 5/0023; H04L 5/0053; H04L 5/0048; H04L 25/0204; H04L 5/0073; H04L 5/0051; H04L 1/06; H04L 27/2646
USPC .......................................................... 375/262
See application file for complete search history.

(56) References Cited

U.S. PATENT DOCUMENTS

| | | | |
|---|---|---|---|
| 2013/0170572 A1* | 7/2013 | Asplund | H04B 7/0658 375/267 |
| 2013/0230087 A1 | 9/2013 | Moorti | |
| 2014/0051377 A1* | 2/2014 | Wang | H04B 7/0874 455/273 |
| 2014/0056381 A1* | 2/2014 | Wang | H04B 7/0874 375/295 |
| 2022/0263564 A1* | 8/2022 | Lee | H04B 7/024 |
| 2022/0368402 A1* | 11/2022 | Raghavan | H04B 7/0695 |
| 2023/0208535 A1* | 6/2023 | Raghavan | H04B 17/12 |

\* cited by examiner step 401: perform beamforming process to obtain weighting vector txV0 which includes weightings txw0[1] to txw0[16] associated with antennas a[1] to a[12], as well as weighting vector rxV0 which includes weightings rxw0[1] to rxw0[16] associated with a[1] to a[12]; also obtain channel estimations ch[1] to ch[12] associated with a[1] to a[12]

step 403: initialize by setting i = 2, txS = S[1,1], txCP = empty set

1st iteration step 405: construct txV[2,1] and txV[2,2] associated with S[2,1] and S[2,2] ⊂ txS = S[1,1]
 txV[2,1] includes weightings txw[2,1,1] to txw[2,1,4] associated with a[1] to a[4] in S[2,1]
 txV[2,2] includes weightings txw[2,2,5] to txw[2,2,8] associated with a[5] and a[6] in S[2,2]

step 407: calculate Q[2,1] and Q[2,2] along with P[2,1] and P[2,2] associated with S[2,1] and S[2,2]
 Q[2,1] and P[2,1]: only a[1] to a[4] used (weighted by txw[2,1,1] to txw[2,1,4])
 Q[2,2] and P[2,2]: only a[5] and a[6] used (weighted by txw[2,1,5] to txw[2,1,8])

step 409: assuming Q[2,1] is better than Q[2,2], so select S[2,1], update txS = S[2,1], and include S[2,1] in txCP step 411: iterate back to step 405 for another level index i = 3

(to FIG. 5b)

FIG. 5a (from FIG. 5c)

1st example of step 413 step 413: with txCP including S[2,1], S[3,2] and S[4,3], assuming each of P[2,1], P[3,2] and P[4,3] meets the operation requirement(s), select S[4,3] and use a[3] in S[4,3], weighted by txw[4,3,3] in txV[4,3], for subsequent communication (e.g., transmission)

FIG. 5d (from FIG. 5c)

2nd example of step 413 step 413: with txCP including S[2,1], S[3,2] and S[4,3], assuming each of P[2,1] and P[3,2] meets the operation requirement(s), select S[3,2] and use a[3] and a[4] in S[3,2], weighted by txw[3,2,3] and txw[3,2,4] in txV[3,2], for subsequent communication (e.g., transmission)

FIG. 5e step 401: perform beamforming process to obtain weighting vector txV0 which includes weightings txw0[1] to txw0[16] associated with antennas a[1] to a[12], as well as weighting vector rxV0 which includes weightings rxw0[1] to rxw0[16] associated with a[1] to a[12]; also obtain channel estimations ch[1] to ch[12] associated with a[1] to a[12]

step 603: initialize by setting i = 2, rxS = S[1,1], rxCP = empty set

1st iteration step 605: construct rxV[2,1] and rxV[2,2] associated with S[2,1] and S[2,2] ⊂ rxS = S[1,1]
    rxV[2,1] includes rxw[2,1,1] to rxw[2,1,4] associated with a[1] to a[4] in S[2,1]
    rxV[2,2] includes rxw[2,2,5] to rxw[2,2,8] associated with a[5] and a[6] in S[2,2]

step 607: calculate Q[2,1] and Q[2,2] associated with S[2,1] and S[2,2]
    Q[2,1]: only a[1] to a[4] used (weighted by rxw[2,1,1] to rxw[2,1,4])
    Q[2,2]: only a[5] and a[6] used (weighted by rxw[2,2,5] to rxw[2,2,8])

step 609: assuming Q[2,1] is better than Q[2,2], so select S[2,1] and set rxS = S[2,1], and include S[2,1] in rxCP step 611: iterate back to step 605 for i = 3

(to FIG. 7b)

FIG. 7a (from FIG. 7b)

3rd iteration step 605: construct rxV[4,1] and rxV[4,2] associated with S[4,1] and S[4,2] ⊂ rxS = S[3,1]
  rxV[4,1] includes rxw[4,1,1] associated with a[1] in S[4,1]
  rxV[4,2] includes rxw[4,2,2] associated with a[2] in S[4,2]

step 607: calculate Q[4,1] and Q[4,2] associated with S[4,1] and S[4,2]
  Q[4,1]: only a[1] used (weighted by rxw[4,1,1])
  Q[2,2]: only a[2] used (weighted by rxw[4,2,2])

step 609 assuming Q[4,1] is better than Q[4,2], so select S[4,1], set rxS = S[4,1], and include S[4,1] in rxCP step 611: proceed to step 613 step 613: with rxCP including S[2,1], S[3,1] and S[4,1], assuming P[2,1], P[3,1] and P[4,1] meet the reception operation requirement(s), select S[4,1] of the lowest antenna count, and use a[1] in S[4,1], weighted by rxw[4,1,1] in rxV[4,1], for subsequent communication (e.g., reception)

FIG. 7c at step 405, as S[i,j_d] is a subset of txS and includes a[n_1] to a[n_H] which cooperate with rfc[k_1] to rfc[k_M], when constructing txV[i,j_d] which is associated with S[i,j_d] and includes txw[i,j_d,k_1] to txw[i,j_d,k_M] associated with a[n_1] to a[n_H] and rfc[k_1] to rfc[k_M], fetch txw0[k_1] to txw0[k_M] included in txV0 (step 401) or txw[i',j',k_1] to txw[i',j',k_M] included in txV[i',j'] constructed at step 405 of previous iteration (i' ≠ i), and set txw[i,j_d,k_1] to txw[i,j,k_M] accordingly

FIG. 8a at step 405, as S[i,j_d] is a subset of txS and includes a[n_1] to a[n_H] which cooperate with rfc[k_1] to rfc[k_M], when constructing txV[i,j_d] which is associated with S[i,j_d] and includes txw[i,j_d,k_1] to txw[i,j_d,k_M] associated with a[n_1] to a[n_H] and rfc[k_1] to rfc[k_M], calculate txw[i,j_d,k_1] to txw[i,j_d,k_M] by solving a beamforming optimization problem under a condition that only a[n_1] to a[n_H] are used

FIG. 8b at step 605, as S[i,j_d] is a subset of rxS and includes a[n_1] to a[n_H] which cooperate with rfc[k_1] to rfc[k_M], when constructing txV[i,j_d] which is associated with S[i,j_d] and includes txw[i,j_d,k_1] to txw[i,j_d,k_M] associated with a[n_1] to a[n_H] and rfc[k_1] to rfc[k_M], fetch rxw0[k_1] to rxw0[k_M] included in rxV0 (step 401) or rxw[i',j',k_1] to rxw[i',j',k_M] included in rxV[i',j'] constructed at step 605 of previous iteration (i' ≠ i), and set rxw[i,j_d,k_1] to rxw[i,j,k_M] accordingly

FIG. 9a at step 605, as S[i,j_d] is a subset of rxS and includes a[n_1] to a[n_H] which cooperate with rfc[k_1] to rfc[k_M], when constructing rxV[i,j_d] which is associated with S[i,j_d] and includes rxw[i,j_d,k_1] to rxw[i,j_d,k_M] associated with a[n_1] to a[n_H] and rfc[k_1] to rfc[k_M], calculate rxw[i,j_d,k_1] to rxw[i,j_d,k_M] by solving a beamforming optimization problem under a condition that only a[n_1] to a[n_H] are used

FIG. 9b

METHOD FOR ANTENNA SELECTION OF USER EQUIPMENT

This application claims the benefit of U.S. provisional application Ser. No. 63/296,000, filed Jan. 3, 2022, and People's Republic of China application Serial No. 202211676965.3 filed Dec. 26, 2022, the subject matters of which are incorporated herein by references.

FIELD OF THE INVENTION

The present invention relates to a method for antenna selection of a user equipment (UE), and more particularly, to a method which may hierarchically and adaptively select fewer antennas from all antennas in an antenna set for wireless communication, and may therefore effectively reduce power consumption of wireless communication without compromising communication quality.

BACKGROUND OF THE INVENTION

Modern user equipment (UE) comprises a plurality of antennas for wireless communication, and how to use the antennas effectively and wisely is essential for development of UE technology.

SUMMARY OF THE INVENTION

An object of the invention is providing a method (e.g., 400 or 600 in FIG. 4 or 6) for antenna selection of a UE (e.g., 10 in FIG. 1 or 2). The UE may comprise a plurality of antennas (e.g., a[1] to a[12] in FIG. 1, or a[1] to a[N] in FIG. 2) for wireless communication. The method may be executed by the UE (e.g., a processor or the UE), and may comprise: executing a quality evaluation step (e.g., 407 in FIGS. 4 and 5a to 5c, or 607 in FIGS. 6 and 7a to 7c), and executing a preliminary selection step (e.g., 409 in FIG. 4, 5a to 5c, or 609 in FIGS. 6, 7a to 7c). The quality evaluation step may comprise: calculating one or more quality evaluations (e.g., Q[i,j] in FIG. 4 or 6, or Q[2,1] to Q[2,2] in FIG. 5a or 7a) respectively associated with one or more first antenna subsets (e.g., S[i,j] in FIG. 2, 4 or 6, or S[2,1] to S[2,2] in FIG. 1, 5a or 7a). The preliminary selection step may comprise: selecting one of the one or more first antenna subsets according to the one or more quality evaluations. Each of the one or more first antenna subsets may include one or more of the plurality of antennas. Each (e.g., Q[2,1] or Q[2,2] in FIG. 5a or 7a) of the one or more quality evaluations, being associated with one (e.g., S[2,1] or S[2,2] in FIG. 1, 5a or 7a) of the one or more first antenna subsets, may comprise one or more communication qualities, and may be calculated under a condition that the one or more (e.g., a[1] to a[4] or a[5] to a[6] in FIG. 1, 5a or 7a) of the plurality of antennas included in the associated first antenna subset are used to communicate (e.g., to transmit and/or receive).

In an embodiment (e.g., FIG. 4 or 6), the method may further comprise (e.g., step 401 in FIG. 4 or 6): before the quality evaluation step (e.g., 407 or 607 in FIG. 4 or 6), calculating a plurality of channel estimations (e.g., ch[1] to ch[N] in FIG. 4 or 6) respectively associated with the plurality of antennas. When calculating the one or more quality evaluations at the quality evaluation step, the UE may calculate the one or more quality evaluations based on the plurality of channel estimations.

In an embodiment (e.g., FIG. 4 or 6), the method may further comprise: before the quality evaluation step (e.g., 407 or 607 in FIG. 4 or 6), executing a weighting construction step (e.g., 405 or 605 in FIG. 4 or 6). The weighting construction step may comprise: constructing one or more present-level weighting vectors (e.g., txV[i,j] in FIG. 4, rxV[i,j] in FIG. 6, txV[2,1] to txV[2,2] in FIG. 5a, or rxV[2,1] to rxV[2,2] in FIG. 7a) respectively associated with the one or more first antenna subsets (e.g., S[i,j] in FIG. 4 or 6, or S[2,1] to S[2,2] in FIG. 5a or 7a). Each (e.g., txV[2,1] or txV[2,2] in FIG. 5a, or rxV[2,1] or rxV[2.2] in FIG. 7a) of the one or more present-level weighting vectors, being associated with one of the one or more first antenna subsets (e.g., S[2,1] or S[2,2] in FIG. 5a or 7a), may include one or more present-level weightings (e.g., txw[2,1,1] to txw[2,1,4] or txw[2,2,5] to txw[2,2,8] in FIG. 5a, or rxw[2,1,1] to rxw[2,1,4] or rxw[2,2,5] to rxw[2,2,8] in FIG. 7a) associated with the one or more (e.g., a[1] to a[4] or a[5] to a[6] in FIG. 5a or 7a) of the plurality of antennas included in the associated first antenna subset. Each (e.g., Q[2,1] or Q[2,2] in FIG. 5a or 7a) of the one or more quality evaluations, being associated with one (e.g., S[2,1] or S[2,2] in FIG. 5a or 7a) of the one or more first antenna subsets, may be calculated under a condition that the one or more (e.g., a[1] to a[4] or a[5] and a[6] in FIG. 5a, or a[1] and a[2] or a[3] and a[4] in FIG. 7b) of the plurality of antennas included in the associated first antenna subset being weighted by the one or more present-level weightings (e.g., txw[2,1,1] to txw[2,1,4] or txw[2,2,5] to txw[2,2,8] in FIG. 5a, or rxw[2,1,1] to rxw[2,1,4] or rxw[2,2,5] to rxw[2,2,8] in FIG. 7a) included in the associated present-level weighting vector (e.g., txV[2,1] or txV[2,2] in FIG. 5a, or rxV[2,1] or rxV[2,2] in FIG. 7a), are used to communicate.

In an embodiment (e.g., FIG. 8a), when constructing a certain present-level weighting vector (e.g., txV[2,1] in FIG. 5a) of the one or more present-level weighting vectors which is associated with a certain first antenna subset (e.g., S[2,1] in FIG. 5a) of the one or more first antenna subsets, the UE may fetch one or more previous weightings (e.g., txw0 [1] to txw0 [4] in FIG. 5a), and may set the one or more present-level weightings (e.g., txw[2,1,1] to txw[2,1,4] in FIG. 5a) included in the certain present-level weighing vector according to the one or more previous weightings. The one or more previous weightings (e.g., txw0 [1] to txw0 [4] in FIG. 5a) may be associated with the one or more (e.g., a[1] to a[4] in FIG. 5a) of the plurality of antennas included in the certain first antenna subset (e.g., S[2,1]), and may be recorded before the weighting construction step (e.g., 405 in FIG. 5a).

In an embodiment (e.g., FIG. 8b), when constructing a certain present-level weighting vector (e.g., txV[2,1] in FIG. 5a) of the one or more present-level weighting vectors which is associated with a certain first antenna subset (e.g., S[2,1] in FIG. 5a) of the one or more first antenna subsets, the UE may calculate the one or more present-level weightings (e.g., txw[2,1,1] to txw[2,1,4] in FIG. 5a) included in the certain present-level weighting vector by solving a beamforming optimization problem under a condition that (e.g., only) the one or more (e.g., a[1] to a[4] in FIGS. 1, 5a and 8b) of the plurality of antennas included in the certain first antenna subset are used.

In an embodiment (e.g., FIG. 4 or FIGS. 5c to 5e), the method may further comprise executing an advanced selection step (e.g., 413 in FIG. 4, 5d or 5e, or 613 in FIG. 6 or 7c) after executing the preliminary selection step (e.g., 409). The advanced selection step may comprise: from a candidate pool (e.g., txCP or rxCP in FIG. 4 or 6) which may comprise one or more second antenna subsets (e.g., S[i1,j_selected_at_i1] to S[iZ,j_selected_at_iZ] in FIG. 4 or 6), selecting one of the one or more second antenna subsets according to one or more parameter evaluations (e.g., P[i1,j_selected_at_i1] to P[iZ,j_selected_at_iZ]). The one or more parameter evaluations may be associated with the one or more second antenna subsets respectively, and each of the one or more second antenna subsets may include one or more of the plurality of antennas. The preliminary selection step may further comprise: after selecting the one of the one or more first antenna subsets according to the one or more quality evaluations, including the selected one (e.g., S[i,j_selected_at_i] of the one or more first antenna subsets in the candidate pool.

In an embodiment (e.g., FIG. 4 or 6), the method may further comprise: before the advanced selection step, calculating one or more parameter evaluations (e.g., P[i,j] in FIG. 4 or 6) respectively associated with the one or more second antenna subsets. Each of the one or more parameter evaluations may be associated with one of the one or more second antenna subsets, may comprise one or more parameters of the UE, and may be calculated under a condition that (e.g., only) the one or more of the plurality of antennas included in the associated second antenna subset are used to communicate.

In an embodiment (e.g., FIG. 4 or 6), selecting the one of the one or more second antenna subsets according to the one or more parameter evaluations may comprise: picking one or more compliant antenna subsets (e.g., S[#1,j_selected_at_#1] to S[#G,j_selected_at_#G] from the one or more second antenna subsets by picking a certain second antenna subset of the one or more second antenna subsets as one of the one or more compliant antenna subsets if a certain parameter evaluation of the one or more parameter evaluations, which is associated with the certain second antenna subset, meets one or more operation requirements; and, according to one or more counts respectively associated with the one or more compliant antenna subsets, selecting one (e.g., S[ig,j_selected_at_ig] in FIG. 4 or 6) of the one or more compliant antenna subsets as the selected one of the one or more second antenna subsets. Each of the one or more counts may be associated with one of the one or more compliant antenna subsets, and may relate to a count of the one or more antennas included in the associated one of the one or more compliant antenna subsets.

In an embodiment, the one or more operation requirements may relate to one or more of the following: maximum power reduction (MPR), power management maximum power reduction (P-MPR), error vector magnitudes (EVM) and time-averaged power density.

In an embodiment, when selecting one of the one of more compliant antenna subsets according to the one or more counts respectively associated with the one or more compliant antenna subsets, selecting a said compliant antenna subset which is associated with the lowest count among the one or more compliant antenna subsets.

In an embodiment, the method may further comprise: after selecting the one of the one or more compliant antenna subsets, causing the UE to use the one or more of the plurality of antennas included in the selected one of the one or more compliant antenna subsets for subsequent communication.

In an embodiment, when causing the UE to use the one or more of the plurality of antennas included in the selected one of the one or more compliant antenna subsets for subsequent communication, further causing the UE not to use rest of the plurality of antennas.

In an embodiment, each of the one or more parameter evaluations may be associated with one of the one or more second antenna subsets, and may relate to power of one or more power amplifiers coupled to the one or more of the plurality of antennas included in the associated one of the one or more second antenna subsets.

In an embodiment (e.g., FIG. 4 or 5e), each of the one or more antenna subsets may be a strict subset of the previous antenna subset.

In an embodiment, the method may further comprise: after selecting the one of the one or more antenna subsets according to the one or more quality evaluations, iterating the quality evaluation step and the selection step by: calculating one or more next-level quality evaluations respectively associated with one or more next-level antenna subsets, and selecting one of the one or more next-level antenna subsets according to the one or more next-level quality evaluations. Each of the one or more next-level antenna subsets may include one or more of the plurality of antennas. Each of the one or more next-level quality evaluations may be associated with one of the one or more next-level antenna subsets, and may be calculated under a condition that (e.g., only) the one or more of the plurality of antennas included in the associated next-level antenna subset are used to communicate. A count of the one or more antennas included in each of the one or more next-level antenna subsets may not be greater than a count of the one or more antennas included in the selected one of the one or more first antenna subsets.

In an embodiment, at least one of the one or more next-level antenna subsets may be a strict subset of the selected one of the one or more first antenna subset.

In an embodiment (e.g., FIG. 6), the method may further comprise (e.g., step 621): monitoring one or more reception qualities, and may also comprise: before iterating the quality evaluation step and the preliminary selection step, determining whether to iterate the quality evaluation step and the preliminary selection step according to the one or more reception qualities.

In an embodiment (e.g., FIG. 6), the method may further comprise (e.g., step 621): monitoring one or more reception qualities, and may also comprise: before executing the quality evaluation step and the preliminary selection step, determining whether to execute the quality evaluation step and the preliminary selection step according to the one or more reception qualities.

In an embodiment (e.g., FIG. 6), the one or more reception qualities may relate to one or more of the following: channel quality, receiving quality, throughput, runtime power consumption, whether downlink data transmission type is dense or sparse, and type of current user application.

In an embodiment, each of the one or more quality evaluations may comprise one or more communication qualities which may relate to one or more of the following: reference signal received power (RSRP), reference signal received quality (RSRQ), received signal strength indicator (RSSI) and signal to interference and noise ratio (SINR), etc.

In an embodiment (e.g., FIG. 1), two (e.g., S[3,1] and S[3,2]) of the one or more antenna subsets are mutually exclusive.

An object of the invention is providing a UE (e.g., 10 in FIG. 1) which may implement the aforementioned method. Another object of the invention is providing a processor (e.g., 130 in FIG. 1) which may control the UE to implement the method.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which:

FIGS. 5a to 5e demonstrate an example when the UE in FIG. 1 executes the transmitting antenna selection in FIG. 4;

FIGS. 7a to 7c demonstrate an example when the UE in FIG. 1 executes the reception antenna selection in FIG. 6;

FIGS. 8a and 8b demonstrate two examples according to two embodiments of the invention, regarding a step of constructing weighting vectors in the flowchart shown in FIG. 4; and FIGS. 9a and 9b demonstrate two examples according to two embodiments of the invention, regarding a step of constructing weighting vectors in the flowchart shown in FIG. 6.

DETAILED DESCRIPTION OF PREFERRED EMBODIMENTS

Figure 1:
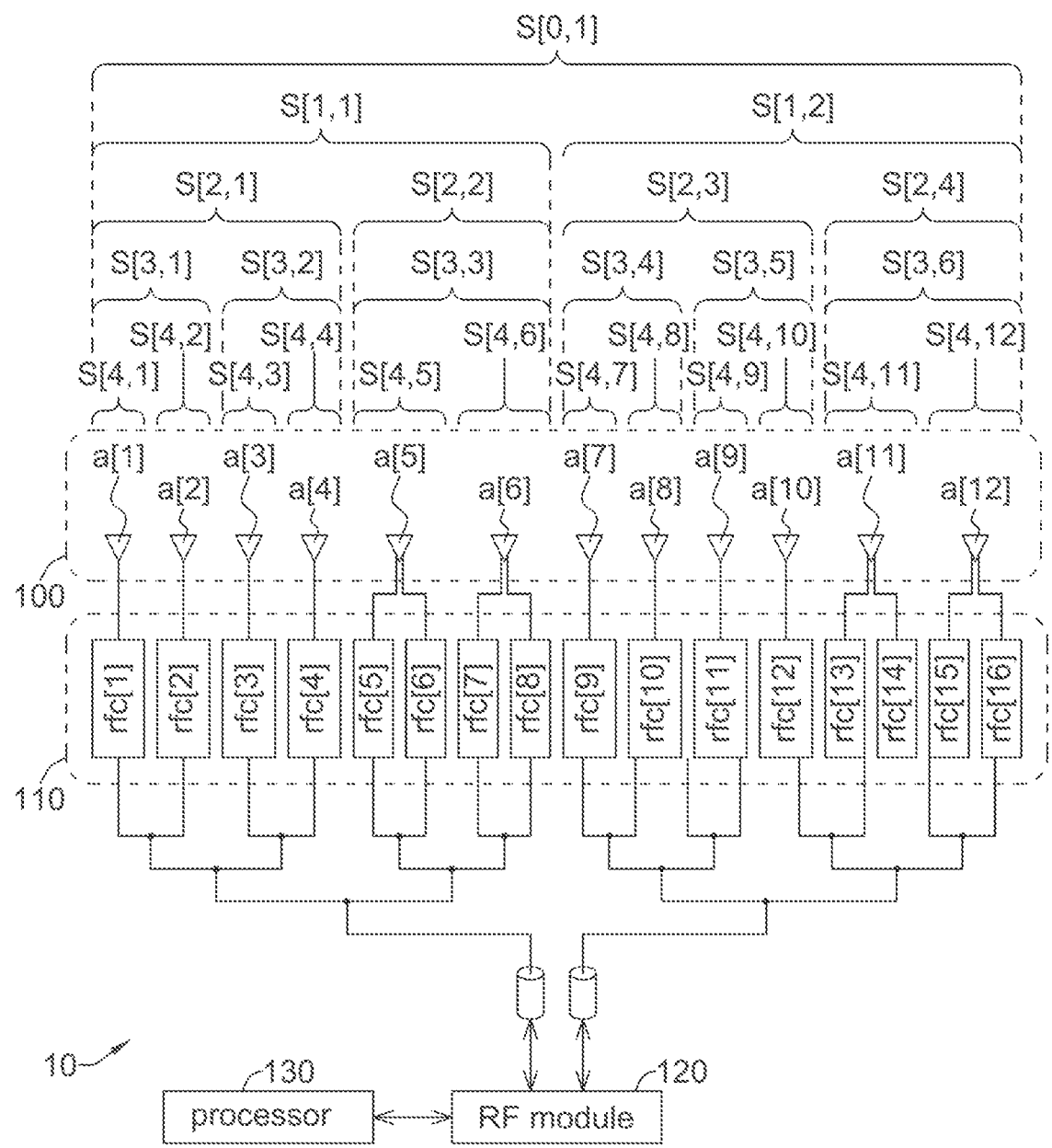
FIG. 1 depicts a schematic view of an example of a UE according to an embodiment of the invention; the UE may include an antenna set with a plurality of antennas, and may also include a plurality of radiofrequency (RF) circuits associated with the plurality of antennas respectively.

FIG. 1 schematically depicts a UE 10 according to an embodiment of the invention. For example, the UE 10 may be a mobile phone, a smart phone, a tablet computer, a notebook computer, a laptop computer, a desktop computer, a wearable gadget (e.g., smart watch, ear phone or glasses, etc.), a drone, a digital camera, a digital camcorder, a set-top box, a smart speaker, a game console, a home appliance (e.g., smart TV, air conditioner, lighting system, refrigerator, washing machine, etc.), an office equipment (e.g., copy machine, printer, audio or video conference system, surveillance system, etc.), an internet-of-things (IoT) device, a router, a telematic system, a navigator, or any electronics which implements capability of wireless communication, e.g., mobile telecommunication.

The UE 10 may comprise an antenna set (e.g., an antenna array) 100, a radiofrequency circuit set 110, an RF module 120 and a processor 130. The antenna set 100 may comprise one or more antennas, such as antennas a[1] to a[12] in the example of FIG. 1. The RF circuit set 110 may comprise one or more RF circuits, such as RF circuits rfc[1] to rfc[16] in the example of FIG. 1. Each RF circuit rfc[k] (for index k=1 to 16 in the example of FIG. 1) may be coupled between an associated antenna a[n] (with index n being one of 1 to 12 in the example of FIG. 1) and the RF module 120, and may cooperate with the antenna a[n]. Each antenna a[n] (for index n=1 to 12 in the example of FIG. 1) may be coupled to, and may thereby cooperate with, one or more associated RF circuits; as shown in the example of FIG. 1, the antenna a[1] may be coupled to and cooperate with a single RF circuit rfc[1], while the antenna a[5] may be coupled to and cooperate with two RF circuits rfc[5] and rfc[6].

The RF module 120 may be coupled between the processor 130 and the RF circuit set 110, and may convert between analog RF signal(s) of the RF circuit set 110 and digital baseband signal(s) of the processor 130. The processor 130 may be formed by digital logic circuitry; in cooperation with the antenna set 100, the RF circuit set 110 and the RF module 120, the processor 130 may direct operations of the UE 10; for example, the processor 130 may control the UE 110 to wirelessly communicate with a remote participant of a wireless network (not depicted), such as a base station of a mobile telecommunication network. The UE 10 may further comprise other circuit(s) and/or hardware module(s) not depicted for conciseness, such as graphic processing unit(s), signal processing unit(s), power management circuit, one or more memories, and/or human interface module(s) such as display panel(s), touch sensing module(s), keyboard(s), button(s), speaker(s), microphone(s), sensor(s) and/or camera(s), etc.

As shown in FIG. 1, to implement the invention, the antenna set 100 may be divided into one or more levels of antenna subsets, wherein different levels may correspond to different division granularities. For example, as shown in FIG. 1, an antenna subset S[0,1] may be a zeroth level subset of the antenna set 100, and may include all the antennas a[1] to a[12] of the antenna set 100. The antenna set 100 may be divided to two first level antenna subsets S[1,1] and S[1,2] which may respectively include the antennas a[1] to a[6] and a[7] to a[12] of the antenna set 100. The antenna set 100 may also be divided to four second level antenna subsets S[2,1] to S[2,4], which may respectively include the antennas a[1] to a[4], a[5] to a[6], a[7] to a[10] and a[11] to a[12]. The antenna set 100 may further be divided to six third level antenna subset S[3,1] to S[3,6], which may respectively include the antennas a[1] to a[2], a[3] to a[4], a[5] to a[6], a[7] to a[8], a[9] to a[10] and a[11] to a[12]. The antenna set 100 may also be divided to twelve fourth level antenna subsets S[4,1] to S[4,12] which may respectively include the antennas a[1] to a[12].

Figure 2:
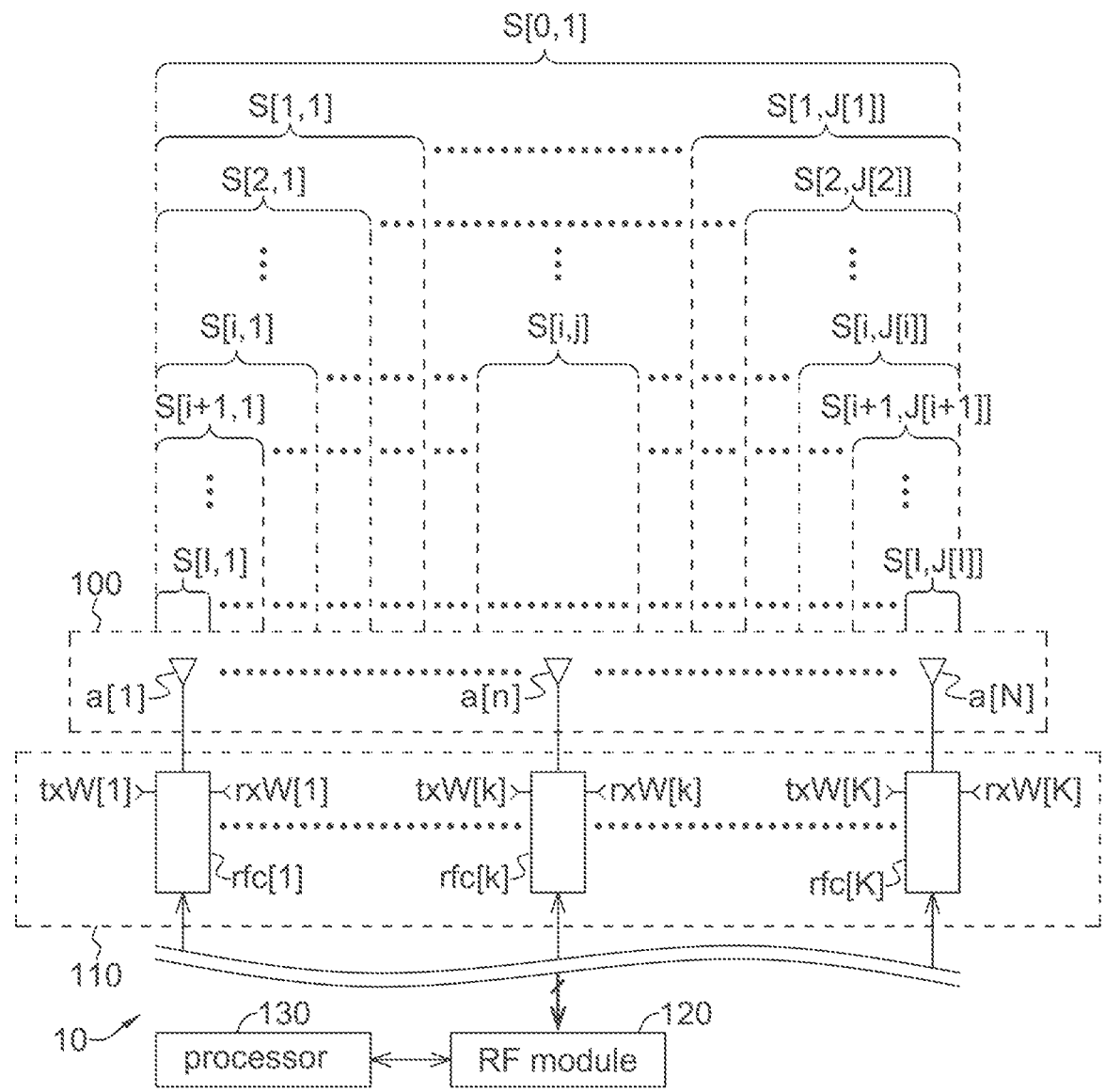
FIG. 2 is a schematic view of a UE according to an embodiment of the invention.

FIG. 2 depicts a general arrangement of different levels of antenna subsets. As shown in FIG. 2, the antenna set 100 may comprise antennas a[1] to a[N] with number N being a predefined integer; the antennas a[1] to a[N] may be included in zeroth level antenna subset S[0,1], and may be grouped to a number J[i] of i-th level antenna subsets S[i,1] to S[i,J[i]], for index i=1 to I, with number I being a predefined integer, and number J[i] being an integer which may vary as the index i varies (in the example of FIGS. 1, J[1]=2, J[2]=4, J[3]=6 and J[4]=12). Each antenna subset S[i,j] may include one or more of the antennas a[1] to a[N]. In an embodiment, each antenna subset S[i,j] may not include all the antennas a[1] to a[N]. As shown in FIG. 2, the antenna set 100 may be divided to a number J[1] of first level antenna subsets S[1,1] to S[1,J[1]], a number J[2] of second level antenna subsets S[2,1] to S[2,J[2]], . . . , and a number J[I] of I-th level antenna subsets S[I,1] to S[I,J[I]]. In an embodiment, the number J[i] may be smaller than or equal to the number J[i+1]. In an embodiment, a count of antennas included in an (i+1)-th level antenna subset S[i+1,j'] (referred to as an antenna count of the antenna subset S[i+1,j']) may be smaller than or equal to a count of antennas included in an i-th level antenna subset S[i,j] (i.e., an antenna count of the antenna subset S[i,j]), with index j' being one of 1 to J[i+1], and index j being one of 1 to J[i]. In an embodiment, the number J[I] may equal the number N, and each I-th level antenna subset S[I,j] may include one single antenna a[j] of the antennas a[1] to a[N].

In an embodiment, an (i+1)-th level antenna subset S[i+1,j2] may be a strict subset of an i-th antenna subset S[i,j1], with index j2 being one of 1 to J[i+1] and index j1 being one of 1 to J[i]; e.g., any antenna included in the antenna subset S[i+1,j2] may also be included in the antenna subset S[i,j1], and the subset S[i,j1] may further include one or more other antennas which are not included in the antenna subset S[i+1,j2]. In an embodiment, an (i+1)-th level antenna subset S[i+1,j4] may equal an i-th antenna subset S[i,j3] with index j3 being one of 1 to J[i] and index j4 being one of 1 to J[i+1].

In an embodiment, an i-th level antenna subset S[i,j5] may be a union of two or more of the (i+1)-th level antenna subsets S[i+1,1] to S[i+1,J[i+1]], such as antenna subsets S[i+1,j6] and S[i+1,j7], with index j5 being one of 1 to J[i] and indices j6 and j7 being different two of 1 to J[i+1]. In an embodiment, an i-th level antenna subset S[i,j8], with index j8 being one of 1 to J[i], may not be a union of any two (or more) of the (i+1)-th level antenna subsets S[i+1,1] to S[i+1,J[i+1]].

In an embodiment, two i-th level antenna subsets S[i,j9] and S[i,j10] may be mutually exclusive; e.g., an antenna a[n1] which is included in the antenna subset S[i,j9] may not be included in the antenna subset S[i,j10], and an antenna a[n2] which is included in the antenna subset S[i,j10] may not be included in the antenna subset S[i,j9], with indices j9 and j10 being different two of 1 to J[i], and indices n1 and n2 being different two of 1 to N. In an embodiment, two i-th level antenna subsets S[i,j11] and S[i,j12], may be different but have a nonempty intersection; for example, the antenna subset S[i,j11] may include antennas a[n3] and a[n4], while the antenna subset S[i,j12] may include antennas a[n3] and a[n5], with indices j11 and j12 being different two of 1 to J[i], and indices n3, n4 and n5 being different three of 1 to N.

The example of FIG. 1 may seem to imply that the antennas a[1] to a[12] are sequentially grouped into the antenna subsets S[i,1] to S[i,J[i]], e.g., the first four antennas a[1] to a[4] are grouped into the first one of the antenna subsets S[2,1] to S[2,4], the next two antennas a[5] and a[6] are grouped into the second one of the antenna subsets S[2,1] to S[2,4], and the subsequent four antennas a[7] to a[10] are grouped into the third one of the antenna subsets S[2,1] to S[2,4], etc. However, the invention is not so limited. In a different example (not depicted), the antenna subset S[2,1] may include the antennas a[1], a[3] and a[5], and the antenna subset S[2,2] may include the antennas a[2], a[4] and a[6], etc.; in another example, the antenna subset S[2,1] may include the antennas a[1], a[3], a[8] and a[10], and the antenna subset S[2,3] may include the antennas a[2], a[4], a[7] and a[9], etc.

Though the antennas a[1] to a[12] or a[1] to a[N] of the antenna set 100 respectively shown in FIG. 1 or 2 may seem to imply that the antennas of the antenna set 100 are geometrically arranged to form a one-dimensional linear array, the invention is not so limited. The antennas of the antenna set 100 may geometrically distribute on a planar surface, a curved (e.g., cylindrical) surface, or a complex surface including one or more curved portions and/or one or more parallel or nonparallel planar portions. For example, regarding the antennas a[1] to a[12] in FIG. 1, the antennas a[1] to a[2] and a[7] to a[8] may form a linear array on a left-side surface (not depicted) of the UE 10, the antennas a[5], a[6], a[11] and a[12] may form a linear array on a back-side surface of the UE 10, and the antennas a[3] to a[4] and a[9] to a[10] may form another linear array on a right-side surface of the UE 10; as a different example, the antennas a[1] to a[4] and a[7] to a[10] may form a rectangular array on a top-side surface of the UE 10, and the antennas a[5] to a[6] and a[11] to a[12] may form a linear array on a bottom side of the UE 10.

The antennas of the antenna set 100 may be implemented by one or more radiation structures. In an embodiment, two or more antennas may be implemented by a same radiation structure. For example, regarding the antennas a[1] to a[12] shown in FIG. 1, the antennas a[1] and a[7] may be respectively implemented by two different kinds (modes) of resonances of a same radiation structure, e.g., may be respectively implemented by vertically polarized resonances and horizontally polarized resonances of a patch radiation structure; and/or, the antennas a[5] and a[11] may be respectively implemented by vertically polarized resonances and horizontally polarized resonances of a dipole radiation structure, etc.

As shown in FIG. 2, the RF circuit set 110 may comprise RF circuits rfc[1] to rfc[K] to cooperate with the antennas a[1] to a[N] of the antenna set 110, with number K being a predefined integer. Each RF circuit rfc[k] may be coupled to an associated antenna a[n] of the antenna set 100, for index k=1 to K and index n being one of 1 to N, and may thereby cooperate with the antenna a[n]. In an embodiment, the number K may be greater than or equal to the number N, and each antenna of the antenna set 100 may be coupled to, and may cooperate with, one or more RF circuits of the RF circuit set 110.

Figure 3:
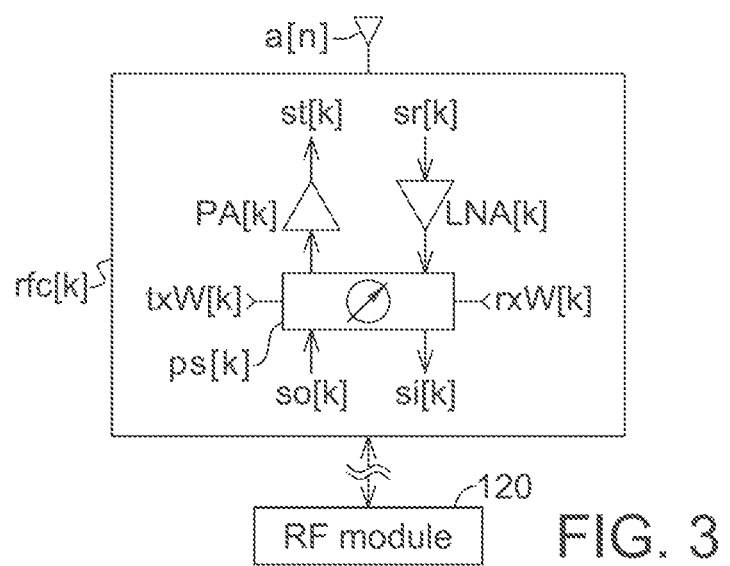
FIG. 3 schematically depicts the RF circuit.

FIG. 3 schematically depicts an RF circuit rfc[k] of the RF circuit set 110 coupled between an associated antenna a[n] of the antenna set 100 and the RF module 120. The RF circuit rfc[k] may cooperate with the associated antenna a[n], and may comprise a power amplifier PA[k], a low-noise amplifier LNA[k] and a weighting circuit ps[k]. The weighting circuit ps[k] and the power amplifier PA[k] may respectively weight (by a weighting txW[k]) and amplify an outbound RF signal so[k] to form a transmission RF signal st[k], and the antenna a[n] may transmit the transmission RF signal st[k] by outgoing electromagnetic waves. The antenna a[n] may also receive incoming electromagnetic waves to form a reception RF signal sr[k], so the low-noise amplifier LNA[k] and the weighting circuit ps[k] may respectively amplify and weight (by a weighting rxW[k]) the reception RF signal sr[k] to form an inbound RF signal si[k]. When weighting the signals so[k] and sr[k], the weighting circuit ps[k] may adjust magnitude and/or shift phase of the signals so[k] and sr[k] according to the weightings txW[k] and rxW[k], respectively. Besides the amplifiers PA[k], LNA[k] and the weighting circuit ps[k], the RF circuit rfc[k] may comprise one or more other circuits which are not depicted in FIG. 3 for conciseness.

When an antenna a[n] is used to communicate (e.g., transmit and/or receive), the associated cooperating RF circuit(s) (i.e., the RF circuit(s) coupled to the antenna a[n]) will be enabled to be used, and will consume power. When the antenna a[n] is not used to communicate, the associated RF circuit(s) will be disabled, and will not consume power.

Figure 4:
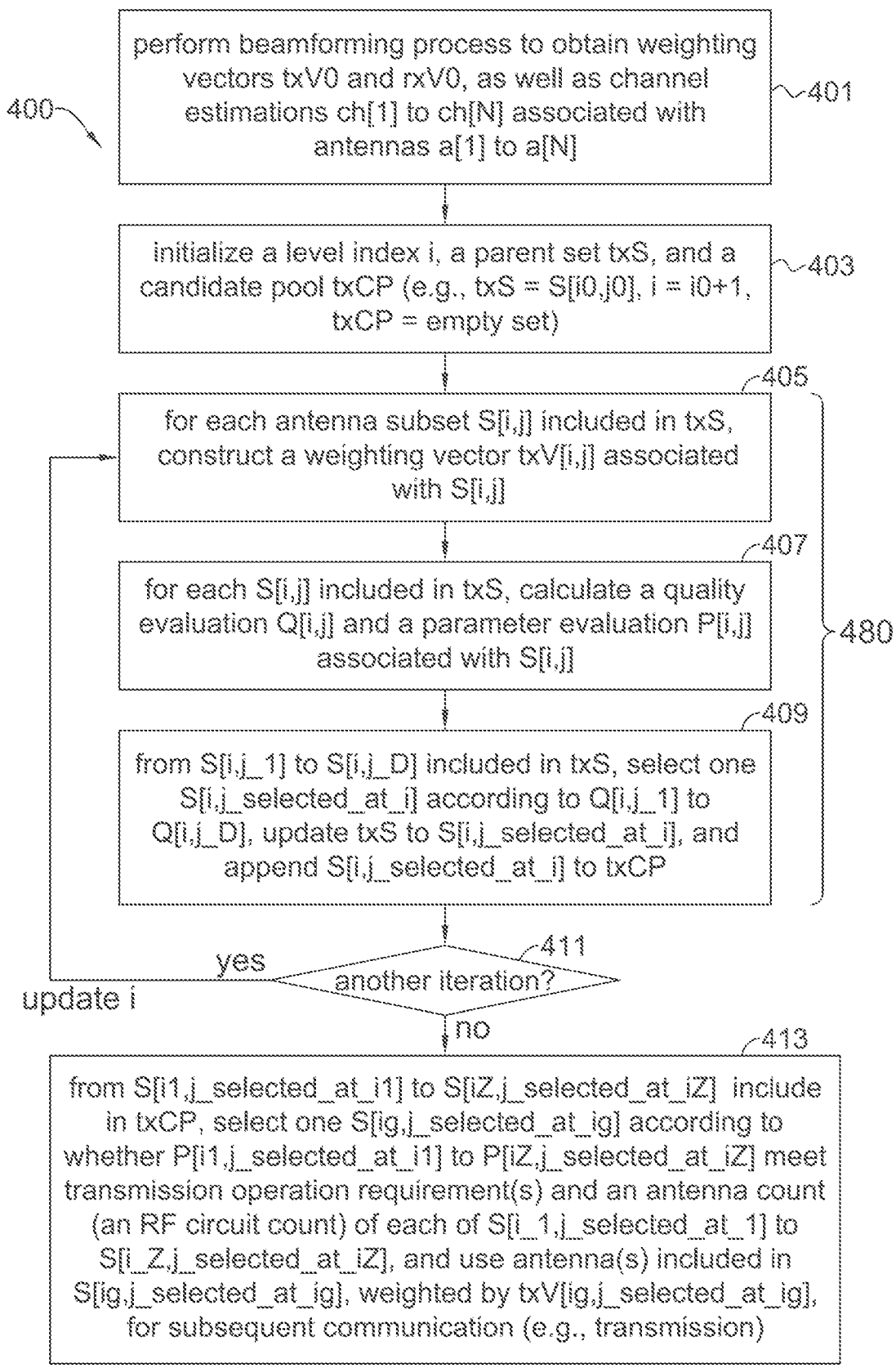
FIG. 4 depicts a flowchart of transmission antenna selection according to an embodiment of the invention.

FIG. 4 depicts a flowchart 400 according to an embodiment of the invention. The processor 130 (FIG. 1 or 2) may control the UE 10 to adopt the flowchart 400 to select antenna(s) for wireless transmission. The flowchart 400 may comprise steps 401, 403, 405, 407, 409, 411 and 413, and steps 405, 407 and 409 may be referred to as a transmission antenna preliminary selection procedure 480 which may iterate one or more times for hierarchical selection. Steps of the flowchart 400 may be described as follows.

Step 401: the processor 130 may control the UE 10 to perform a beamforming process. For example, the processor 130 may control the UE 10 to perform the beamforming process with a remote participant (e.g., a base station) of wireless network, e.g., by transmitting wireless outgoing reference signal(s) to the remote participant and receiving wireless response from the remote participant, as well as receiving incoming reference signal(s) from the remote participant and measuring the received incoming reference signal(s).

The beamforming process may result in a transmission weighting vector txV0 and a reception weighting vector rxV0. The weighting vector txV0 may include transmission weightings txw0 [1] to txw0[K] respectively for the RF circuit rfc[1] to rfc[K] (FIG. 2) of the RF circuit set 110. When the UE 10 uses all the antennas a[1] to a[N] of the antenna set 100 (and thereby all the RF circuits rfc[1] to rfc[K]) to transmit, the UE 10 may adopt the transmission weightings txw0 [1] to txw0[K] as the weightings txW[1] to txW[K] of the RF circuits rfc[1] to rfc[K] (FIGS. 2 and 3) to optimize wireless transmission. The weighting vector rxV0 may include reception weightings rxw0 [1] to rxw0[K] respectively for the RF circuit rfc[1] to rfc[K] (FIG. 2) of the RF circuit set 110. When the UE 10 uses all the antennas a[1] to a[N] of the antenna set 100 (and thereby all the RF circuits rfc[1] to rfc[K]) to receive, the UE 10 may adopt the reception weightings rxw0[1] to rxw0[K] as the weightings rxW[1] to rxW[K] of the RF circuits rfc[1] to rfc[K] (FIGS. 2 and 3) to optimize wireless reception.

However, it should be noted that the weightings txw0[1] to txw0[K] and rxw0[1] to rxw0[K] of the weighting vectors txV0 and rxV0 are derived and calculated under a condition that all the antennas a[1] to a[N] and all the RF circuit rfc[1] to rfc[K] are used for the UE 10 to communicate. Using all the antennas a[1] to a[N] and all the RF circuit rfc[1] to rfc[K] to communicate are very power consuming, and the processor 130 of the UE 10 may adopt the flowchart 400 to systematically select and use fewer antennas and fewer RF circuits when the UE 10 transmits, and may therefore reduce power consuming (and gain other additional advantages) without compromising quality of wireless communication.

Based on result of the beamforming process, the processor 130 of the UE 10 may further calculate (solve) and/or obtain channel estimations ch[1] to ch[N] for the antennas a[1] to a[N] respectively. Each channel estimation ch[n] (for the index n=1 to N) may indicate channel response when only the antenna a[n] is used to communicate, e.g., may indicate how timing, phase and/or amplitude of an RF signal will be when the RF signal propagates between the antenna a[n] and the remote participant.

Step 403: The processor 130 may initialize a level index i, a parent set txS and a candidate pool txCP. For example, assuming that the processor 130 aims to systematically select fewer antenna(s) for transmission from an 10-th level antenna subsets S[i0,j0] with indices i0 and j0 respectively being one of 1 to N and one of 1 to J[i0] (FIG. 2) and the antenna subset S[i0,j0] including one or more antennas cooperating with one or more RF circuits rfc[k_1] to rfc [k_U] for indices k_1 to k_U being different ones of 1 to K if U>1, then the processor 130 may set the level index i to be larger than the index i0 (e.g., to equal (i0+1)), may set the parent set txS to equal the antenna subset S[i0,j0], and may set the candidate pool txCP to be an empty set.

Step 405: for each i-th level antenna subset S[i,j] that is a subset of the parent set txS, the processor 130 of the UE 10 may construct a weighting vector txV[i,j] as a present-level weighting vector associated with the antenna subset S[i,j]. Step 405 may be referred to as a weighting construction step.

For example, assuming that the parent set txS includes one or more i-th level antenna subsets S[i,j_1] to S[i,j_D] (for indices j_1 to j_D being different ones of 1 to J[i] if D>1) as its subset(s), then the processor 130 may construct one or more weighting vectors txV[i,j_1] to txV[i,j_D] respectively associated with the one or more antenna subsets S[i,j_1] to S[i,j_D]. As each antenna subset S[i,j_d] (for index j_d being each of j_1 to j_D) may include one or more antennas a[n_1] to a[n_H] cooperating with one or more RF circuits rfc[k_1] to rfc[k_M] (for indices n_1 to n_H being different ones of 1 to N if H>1, and indices k_1 to k_M being different ones of 1 to K if M>1), each weighting vector txV[i,j_d] associated with the antenna subset S[i,j_d] may include one or more weightings txw[i,j_d,k_1] to txw[i,j_d, k_M] respectively for the RF circuits rfc[k_1] to rfc[k_M] cooperating with the one or more antennas a[n_1] to a[n_H] included in the antenna subset S[i,j_d].

FIG. 8a depicts an embodiment of the weighting construction at step 405. To construct the weighting vector txV[i,j_d] associated with the antenna subset S[i,j_d] which includes the one or more antennas a[n_1] to a[n_H] cooperating with the one or more RF circuits rfc[k_1] to rfc [k_M], the processor 130 of the UE 10 may fetch one or more previous weightings, such as one or more weightings txw0[k_1] to twx0[k_M] from the weightings txw0 [1] to txw0[K] of the weighting vector txV0 (step 401), and may set the one or more weightings txw[i,j_d,k_1] to txw[i,j_d, k_M] included in the weighing vector txV[i,j_d] according to the one or more previous weightings txw0[k_1] to txw0 [k_M]. For example, the processor 130 may set the one or more weightings txw[i,j_d,k_1] to txw[i,j_d,k_M] to substantially equal the one or more previous weightings txw0 [k_1] to txw0[k_M] respectively.

When constructing the one or more weightings txw[i,j_d, k_1] to txw[i,j_d, k_M] of the weighting vector txV[i,j_d] according to one or more previous weightings, the one or more previous weightings may also be one or more weightings txw[i'j',k_1] to txw[i',j',k_M] included in a weighting vector txV[i',j'] constructed at step 405 of a previous iteration (if exists), with index i' being one of 1 to I (FIG. 2) and unequal to (e.g., smaller than) the current level index i, index j' being one of 1 to J[i'] (FIG. 2), and the weighting vector txV[i',j'] being associated with an antenna subset S[i',j'] which may be a subset of the antenna subset S[i0,j0] (step 403), and may include the antenna subset S[i,j_d]. The one or more previous weightings txw0[k_1] to txw0[k_M] or txw[i',j',k_1] to txw[i',j',k_M] may be respectively associated with the one or more RF circuits rfc[k_1] to rfc[k_M] cooperating with the one or more antennas a[n_1] to a[n_H] included in the associated antenna subset S[i,j_d], and may be obtained and recorded (e.g., at step 401 or at step 405 of a previously iteration) before the weighting construction step 405 of current iteration.

FIG. 8b depicts another embodiment of weighting construction at step 405. To constructing the weighting vector txV[i,j_d] associated with the antenna subset S[i,j_d] which includes the one or more antennas a[n_1] to a[n_H] cooperating with the one or more RF circuits rfc[k_1] to rfc [k_M], the processor 130 of the UE 10 may calculate the one or more weightings txw[i,j_d,k_1] to txw[1,j_d,k_M] included in the weighting vector txV[i,j_d] by solving a beamforming optimization problem under a condition that the UE 10 only uses the one or more antennas a[n_1] to a[n_H] (FIG. 2) and the cooperating one or more RF circuits rfc[k_1] to rfc[k_M] to communicate, without using rest antenna(s) of the antenna set 100 and rest RF circuit(s) of the RF circuit set 110.

Step 407 (FIG. 4): for each i-th level antenna subset S[i,j] that is a subset of the parent set txS, the processor 130 of the UE 10 may calculate a quality evaluation Q[i,j] associated with the antenna subset S[i,j]. Step 407 may be referred to as a quality evaluation step. The quality evaluation Q[i,j] may comprise one or more communication qualities, and may be calculated under a condition that UE 10 communicates only using the antenna(s) included in the antenna subset S[i,j] and the cooperating RF circuit(s), without using the antenna(s) not included in the antenna subset S[i,j] and the cooperating RF circuit(s). In an embodiment, the one or more communication qualities in each quality evaluation Q[i,j] associated with the antenna subset S[i,j] may relate to one or more of the following: reference signal received power (RSRP), reference signal received quality (RSRQ), received signal strength indicator (RSSI) and signal to interference and noise ratio (SINR), as well as other quantity or quantities which may reflect channel quality and/or communication quality between the antenna(s) included in the antenna subset S[i,j] and the remote participant.

In addition, for each i-th level antenna subset S[i,j] that is a subset of the parent set txS, the processor 130 of the UE 10 may also calculate a parameter evaluation P[i,j] associated with the antenna subset S[i,j]. The parameter evaluation P[i,j] may quantitatively reflect one or more operation parameters of the UE 10 when the UE 10 communicates (e.g., transmits) only using the antenna(s) included in the antenna subset S[i,j], without using the antenna(s) not included in the antenna subset S[i,j].

As the parent set txS (step 405) may include the one or more i-th level antenna subsets S[i,j_1] to S[i,j_D] as its subset(s), the processor 130 of the UE 10 may calculate one or more quality evaluations Q[i,j_1] to Q[i,j_D] respectively associated with the one or more antenna subsets S[i,j_1] to S[i,j_D], as well as one or more parameter evaluations P[i,j_1] to P[i,j_D] respectively associated with the one or more antenna subsets S[i,j_1] to S[i,j_D]. Based on the channel estimations ch[1] to ch[N] (step 401) associated with the antennas a[1] to a[N] of the antenna set 100, the processor 130 of the UE 10 may calculate the quality evaluation Q[i,j_d] (for index j_d being each one of j_1 to j_D), which is associated with the antenna subset S[i,j_d] including the one or more antennas a[n_1] to a[n_H] cooperating with the one or more the RF circuits rfc[k_1] to rfc[k_M], under a condition that the UE 10 only uses the one or more antennas a[n_1] to a[n_H] and the cooperating RF circuits rfc[k_1] to rfc[k_M], which are weighted by the one or more weightings txw[i,j_d,k_1] to txw[i,j_d,k_M] included in the weighting vector txV[i,j_d] associated with the antenna subset S[i,j_d] (step 405), to communicate (e.g., to transmit), without using rest antenna(s) of the antenna set 100 and rest RF circuit(s) of the RF circuit set 110. In other words, the processor 130 of the UE 10 may calculate the quality evaluation Q[i,j_d], which is associated with the antenna subset S[i,j_d] including the one or more antennas a[n_1] to a[n_H] cooperating with the one or more RF circuits rfc[k_1] to rfc[k_M], under a condition that the UE 10 only uses the one or more antennas a[n_1] to a[n_H] and the cooperating one or more RF circuits rfc[k_1] to rfc[k_M] to communicate, with the one or more RF circuits rfc[k_1] to rfc[k_M] respectively adopting the one or more weightings txw[i,j_d,k_1] to txw[i,j_d,k_M] included in the constructed weighting vector txV[i,j_d] (step 405) as one or more weightings txW[k_1] to txW[k_M] (FIG. 2 or 3) of the one or more RF circuits rfc[k_1] to rfc[k_M], and with the rest antenna(s) of the antenna set 100 and the rest RF circuit(s) of the RF circuit set 110 not being used.

Similarly, the processor 130 of the UE 10 may calculate each parameter evaluation P[i,j_d], which is associated with the antenna subset S[i,j_d] including the one or more antennas a[n_1] to a[n_H] cooperating with the one or more RF circuits rfc[k_1] to rfc[k_M], under a condition that the UE 10 only use the one or more antennas a[n_1] to a[n_H] and the one or more RF circuits rfc[k_1] to rfc[k_M] to communicate, with the one or more RF circuits rfc[k_1] to rfc[k_M] respectively weighted by the one or more weightings txw[i,j_d,k_1] to txw[i,j_d,k_M] of the constructed weighting vector txV[i,j_d] associated with the antenna subset S[i,j_d], and with rest antenna(s) of the antenna set 100 and rest RF circuit(s) of the RF circuit set 110 not being used.

In an embodiment, the parameter evaluation P[i,j_d] associated with the antenna subset S[i,j_d] including the one or more antennas a[n_1] to a[n_H] cooperating with the RF circuits rfc[k_1] to rfc[k_M] may include information reflecting a compensation power value deltaP[i,j_d] associated with the antenna subset S[i,j_d]. The compensation power value deltaP[i,j_d] may be calculated by subtracting a subset-antenna power value RSRP[i,j_d] from an all-antenna power value RSRP0. The subset-antenna power value RSRP[i,j_d] may reflect reference signal received power (RSRP) under a condition that the UE 10 only uses the one or more antennas a[n_1] to a[n_H] and the one or more cooperating RF circuits rfc[k_1] to rfc[k_M] to communicate, with the one or more RF circuits rfc[k_1] to rfc[k_M] respectively being weighted by the one or more weightings txw[k_1] to txw[k_M] of the constructed weighting vector txV[i,j_d] associated with the antenna subset S[i,j_d]. The all-antenna power value RSRP0 may reflect RSRP under a condition that the UE 10 uses all the antennas a[1] to a[N] and all the cooperating RF circuits rfc[1] to rfc[K] to communicate, with the RF circuits rfc[1] to rfc[K] respectively being weighted by the weightings txw0 [1] to txw0[K] of the weighting vector txV0 (step 401).

When the UE 10 only uses the one or more antennas a[n_1] to a[n_H] of the antenna subset S[i,j_d] and the one or more cooperating RF circuits rfc[k_1] to rfc[k_M] to communicate, the UE 10 may cause the one or more power amplifiers PA[k_1] to PA[k_M] (FIG. 3) in the one or more RF circuits rfc[k_1] to rfc[k_M] to boost power of outgoing signals according to the compensation power value deltaP[i,j_d], so signal output power of the one or more RF circuits rfc[k_1] to rfc[k_M] may reach a predefined target power.

Step 409: according to the quality evaluation(s) associated with the antenna subset(s) in the parent set txS, the processor 130 may select one of the antenna subset(s) included in the parent set txS, may update the parent set txS to the selected antenna subset, and may include the selected antenna subset in the candidate pool txCP. Then processor 130 may proceed to step 411. Step 409 may be referred to as a preliminary selection step. As the parent set txS may include the one or more antenna subsets S[i,j_1] to S[i,j_D], the processor 130 may select one of the one or more antenna subsets S[i,j_1] to S[i,j_D] according to the quality evaluations Q[i,j_1] to Q[i,j_D] respectively associated with the antenna subsets S[i,j_1] to S[i,j_D]. For example, the processor 130 may select an antenna subset S[i,j_selected_at_i] from the one or more antenna subsets S[i,j_1] to S[i,j_D] (with index j_selected_at_i being one of j_1 to j_D) if the quality evaluation Q[i,j_selected_at_i] associated with the antenna subset S[i, j_selected_at_i] is the best among the quality evaluations Q[i,j_1] to Q[i,j_D]. Then the processor 130 may update the parent set txS to the selected antenna subset S[i,j_selected_at_i], and may include the selected antenna subset S[i,j_selected_at_i] in the candidate pool txCP, e.g., may append the antenna subset S[i,j_selected_at_i] to the candidate pool txCP.

Step 411: the processor 130 may determine whether to run another iteration of the transmission antenna preliminary selection procedure 480 to further check if it is possible to select even fewer antenna(s) and cooperating RF circuit(s) from the parent set txS updated at step 409. If the processor 130 determines to run another iteration, the processor 130 may iterate back to step 405 with the level index i updated to another value, e.g., an incremented value. On the other hand, if the processor 130 determines not to run another iteration, the processor may proceed to step 413. The processor 130 may determine whether to run another iteration of steps 405, 407 and 409 according to one or more considerations, e.g., whether the index i is below a predefined iteration threshold, and/or whether the quality evaluation Q[i,j_selected_at_i] associated with the selected antenna subset S[i,j_selected_at_i] at step 409 is still in a predefined acceptable quality range (e.g., is better than a predefined quality threshold), etc.

Step 413: after one or more iterations of the transmission antenna preliminary selection procedure 480, the candidate pool txCP may include one or more antenna subsets S[i1,j_selected_at_i1] to S[iZ,j_selected_at_iZ] (with indices i1 to iZ being different ones of 1 to I if Z>1) resulting from the one or more iterations of step 409 respectively. With the one or more antenna subsets S[i1,j_selected_at_i1] to S[iZ,j_selected_at_iZ] being associated with one or more parameter evaluations P[i1,j_selected_at_i1] to P[iZ,j_selected_at_iZ] calculated at one or more iterations of step 407 respectively, the processor 130 may select one of the one or more antenna subsets S[i1,j_selected_at_i1] to S[iZ,j_selected_at_iZ] according to whether each of the one or more parameter evaluations P[i1,j_selected_at_i1] to P[iZ,j_selected_at_iZ] meets one or more transmission operation requirements, and according to the antenna count (and/or an RF circuit count) of each of the one or more antenna subsets S[i1,j_selected_at_i1] to S[iZ,j_selected_at_iZ].

For example, in an embodiment, the processor 130 may pick one or more compliant antenna subsets S[#1,j_selected_at_#1] to S[#G,j_selected_at_#G] from the one or more antenna subsets S[i1,j_selected_at_i1] to S[iZ,j_selected_at_iZ] included in the candidate pool txCP, with indices #1 to #G being different ones of i1 to iZ if G>1. For each antenna subset S[iz,j_selected_at_iz] (with index iz being each of i1 to iZ) included in the candidate pool txCP, the processor 130 may pick the antenna subset S[iz,j_selected_at_iz] as a compliant antenna subset if the associated parameter evaluation P[iz,j_selected_at_iz] meets the transmission operation requirement(s), and may not pick the antenna subset S[iz,j_selected_at_iz] as a compliant antenna subset if the associated parameter evaluation P[iz,j_selected_at_iz] does not meet the transmission operation requirement(s). Then, the processor 130 may select an antenna subset with the lowest antenna count (and/or RF count) from the one or more compliant antenna subsets S[#1,j_selected_at_#1] to S[#G,j_selected_at_#G]. For example, the processor 130 may select an antenna subset S[ig,j_selected_at_ig] (for index ig being one of #1 to #G) from the one or more compliant antenna subsets S[#1,j_selected_at_#1] to S[#G,j_selected_at_#G] if the antenna count (and/or the RF circuit count) of the antenna subset S[ig,j_selected_at_ig] is the lowest among the one or more antenna counts of the one or more antenna subsets S[#1,j_selected_at_#1] to S[#G,j_selected_at_#G]. After selecting the antenna subset S[ig,j_selected_at_ig], the processor 130 may control the UE 10 to use the antenna(s) included in the selected antenna subset S[ig,j_selected_at_ig], along with the RF circuit(s) cooperating with the antenna(s) included in the antenna subset S[ig,j_selected_at_ig] being weighted by the weighting(s) included in the associated weighting vector txV[ig,j_selected_at_ig], for subsequent wireless communication (e.g., transmission); rest antenna(s) (i.e., antenna(s) other than the antenna(s) included in the selected antenna subset S[ig,j_selected_at_ig]), along with the RF circuit(s) cooperating with the rest antenna(s), may not be used.

In an embodiment, the transmission operation requirement(s) may include a power requirement related to one or more of the following: maximum power reduction (MPR), power management maximum power reduction (P-MPR), error vector magnitudes (EVM) and time-averaged power density (TA-PD). As previously mentioned when describing step 407, the parameter evaluation P[i,j_d] associated with the antenna subset S[i,j_d] may include information reflecting the compensation power value deltaP[i,j_d] associated with the antenna subset S[i,j_d], and the compensation power value deltaP[i,j_d] may relate to power of the power amplifiers PA[k_1] to PA[k_M] of the RF circuits rfc[k_1] to rfc[k_M] cooperating with the antennas a[n_1] to a[n_H] included in the associated antenna subset S[i,j_d]. Hence, when the processor 130 checks whether the parameter evaluation P[iz,j_selected_at_iz] meets the transmission operation requirement(s) at step 413, the processor 130 may check whether the compensation power value deltaP[iz,j_selected_at_iz] meets the power requirement. Power of the power amplifiers PA[k_1] to PA[k_M] should be kept in an acceptable power range (e.g., be lower than a power threshold); if power of the power amplifiers PA[k_1] to PA[k_M] exceeds the acceptable power range (e.g., is higher than the power threshold), performance of the power amplifiers PA[k_1] to PA[k_M], as well as RF transmission performance of the UE 10, will degrade, e.g., will suffer from higher nonlinearity, higher radiation and/or higher communication error. As the power requirement may relate to the acceptable power range, the processor 130 may check whether power of the power amplifiers PA[k_1] to PA[k_M] is within the acceptable power range by checking whether the compensation power value deltaP[iz,j_selected_at_iz] embedded in the parameter evaluation P[iz,j_selected_at_iz] meets the power requirement included in said transmission operation requirement(s).

In the flowchart 400, reaching step 413 from step 403 may indicate capability to reduce antenna count (and RF circuit count) used to transmit, since the antenna subset S[ig,j_selected_at_ig] selected at step 413, which is checked to meet the transmission operation requirement(s), is only a subset of the parent set txS at step 403.

It is noted that there may be various embodiments to express the flowchart 400 in FIG. 4, the aforementioned expression of the flowchart 400 may just be one of the embodiments. The flowchart 400 may have more or fewer steps.

Figure 5B:
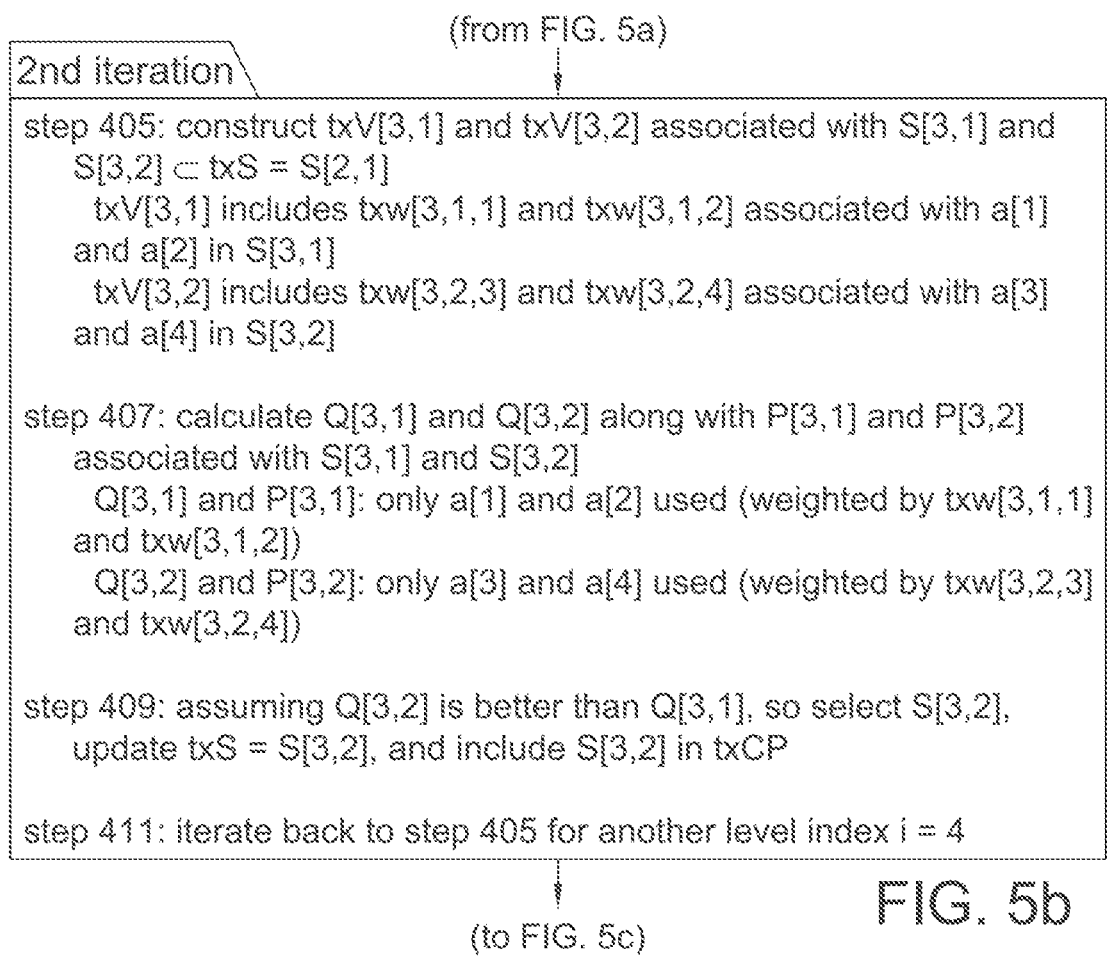

FIGS. 5a to 5e depict an example of applying the flowchart 400 in FIG. 4 to the UE 10 in FIG. 1. As shown in FIG. 5a, at step 401, the processor 130 (FIG. 1) may obtain the transmission weighting vector txV0 and channel estimations ch[1] to ch[12] associated with the antennas a[1] to a[12] (FIG. 1). The weighting vector txV0 may include the weightings txw0[1] to txw0[16] associated with the RF circuits rfc[1] to rfc[16] (FIG. 1) cooperating with the antennas a[1] to a[12], and may be calculated under a condition that all the antennas a[1] to a[12] and all the RF circuits rfc[1] to rfc[16] are used to communicate.

At step 403, the processor 130 may set the level index i to two, may set the parent set txS to the first level antenna subset S[1,1] which includes the antennas a[1] to a[6] cooperating with the RF circuits rfc[1] to rfc[8] (FIG. 1), and may set the candidate pool txCP to be an empty set. By setting the parent set txS to the antenna subset S[1,1], the processor 130 may select between the second level antenna subsets S[2,1] and S[2,2], which are the subsets of the antenna subset S[1,1], by a first iteration of the transmission antenna preliminary selection procedure 480.

At step 405, the processor 130 may construct the weighting vectors txV[2,1] and txV[2,2] respectively associated with the antenna subsets S[2,1] and S[2,2]. The weighting vector txV[2,1], being associated with the antenna subset S[2,1] which may include the antennas a[1] to a[4] cooperating with the RF circuits rfc[1] to rfc[4], may include weightings txw[2,1,1] to txw[2,1,4] respectively associated with the RF circuits rfc[1] to rfc[4]. The weighting vector txV[2,2], being associated with the antenna subset S[2,2] which may include the antennas a[5] to a[6] cooperating with the RF circuits rfc[5] to rfc[8], may include weightings txw[2,2,5] to txw[2,2,8] respectively associated with the RF circuits rfc[5] to rfc[8].

As described by referring to FIGS. 8a and 8b, there may be various embodiments to construct the weighting vectors txV[2,1] and txV[2,2] at step 405 (FIG. 5a). According to FIG. 8a, in an embodiment of constructing the weighting vectors txV[2,1] and txV[2,2], the processor 130 may fetch the weightings txw0 [1] to txw0[4] and txw0[5] to txw0[8] obtained at step 401, and may set values of the weightings txw[2,1,1] to txw[2,1,4] of the weighting vector txV[2,1] and values of the weightings txw[2,2,5] to txw[2,2,8] of the weighting vector txV[2,2] according to the weightings txw0 [1] to txw0 [4] and txw0 [5] to txw0 [8] respectively; e.g., may set the weightings txw[2,1,1] to txw[2,1,4] and txw[2,2,5] to txw[2,2,8] to substantially equal the weightings txw0 [1] to txw0 [4] and txw0 [5] to txw0 [8] respectively.

According to FIG. 8b, in an embodiment of constructing the weighting vectors txV[2,1] and txV[2,2], the processor 130 may calculate the weightings txw[2,1,1] to txw[2,1,4] of the weighting vector txV[2,1] by solving a beamforming problem under a condition that the UE 10 only uses the antennas a[1] to a[4] (and the cooperating RF circuits rfc[1] to rfc[4]) to communicate, without using the rest antennas a[5] to a[12] and the rest RF circuits rfc[5] to rfc[16]. Similarly, the processor 130 may calculate the weightings txw[2,2,5] to txw[2,2,8] of the weighting vector txV[2,2] by solving a beamforming problem under a condition that the UE 10 only uses the antennas a[5] to a[6] (and the cooperating RF circuits rfc[5] to rfc[8]) to communicate, without using the rest antennas a[1] to a[4], a[7] to a[12] and the rest RF circuits rfc[1] to rfc[4] and rfc[9] to rfc[16].

In yet another embodiment of constructing the weighting vectors txV[2,1] and txV[2,2], the processor 130 may set the weightings txw[2,1,1] to txw[2,1,4] of the weighting vector txV[2,1] according to FIG. 8a, and may calculate the weightings txw[2,2,5] to txw[2,2,8] of the weighting vector txV[2,2] according to FIG. 8b; alternatively, the processor 130 may calculate the weightings txw[2,1,1] to txw[2,1,4] of the weighting vector txV[2,1] according to FIG. 8b, and may set the weightings txw[2,2,5] to txw[2,2,8] of the weighting vector txV[2,2] according to FIG. 8a.

At step 407 (FIG. 5a), the processor 130 may calculate the quality evaluations Q[2,1] and Q[2,2], along with the parameter evaluations P[2,1] and P[2,2], associated with the antenna subsets S[2,1] and S[2,2], respectively. The quality evaluation Q[2,1] and the parameter evaluation P[2,1], being associated with the antenna subset S[2,1] which may include the antennas a[1] to a[4] cooperating with the RF circuits rfc[1] to rfc[4], may be calculated under a condition that the UE 10 only uses the antennas a[1] to a[4] and the cooperating RF circuits rfc[1] to rfc[4] to communicate, with the RF circuits rfc[1] to rfc[4] weighted by the weightings txw[2,1,1] to txw[2,1,4], and without using the rest antennas a[5] to a[12] and the rest RF circuits rfc[5] to rfc[16]. The quality evaluation Q[2,2] and the parameter evaluation P[2,2], being associated with the antenna subset S[2,2] which may include the antennas a[5] to a[6] cooperating with the RF circuits rfc[5] to rfc[8], may be calculated under a condition that the UE 10 only uses the antennas a[5] to a[6] and the cooperating RF circuits rfc[5] to rfc[8] to communicate, with the RF circuits rfc[5] to rfc[8] weighted by the weightings txw[2,2,5] to txw[2,2,8], and without using the rest antennas a[1] to a[4], a[7] to a[12] and the rest RF circuits rfc[1] to rfc[4] and rfc[9] to rfc[16].

At step 409, assuming that the quality evaluation Q[2,1] is better than the quality evaluation Q[2,2], so the processor 130 may select the antenna subset S[2,1], may update the parent set txS to be the selected antenna subset S[2,1], and may include the antenna subset S[2,1] in the candidate pool txCP, e.g., may append the antenna subset S[2,1] to the candidate pool txCP. Then the processor 130 may proceed to step 411.

At step 411, the processor 130 may determine whether to iterate back to step 405. For convenience of discussion, it is assumed that the processor 130 decides to proceed back to step 405 for a second iteration, with the level index i updated to three.

As shown in FIG. 5b, at step 405 of the second iteration, because the parent set txS, which is updated to the antenna subset S[2,1] at step 409 of the first iteration (FIG. 5a), includes two antenna subsets S[3,1] and S[3,2], the processor 130 may construct weighting vectors txV[3,1] and txV[3,2] respectively associated with the antenna subsets S[3,1] and S[3,2]. The weighting vector txV[3,1], being associated with the antenna subset S[3,1] which includes the antennas a[1] to a[2] cooperating with the RF circuits rfc[1] to rfc[2], may include weightings txw[3,1,1] and txw[3,1,2]. The weighting vector txV[3,2], being associated with the antenna subset S[3,2] which includes the antennas a[3] to a[4] cooperating with the RF circuits rfc[3] to rfc[4], may include weightings txw[3,2,3] and txw[3,2,4].

Similar to step 405 of the first iteration (FIG. 5a), in an embodiment according to FIG. 8a, at step 405 of the second iteration (FIG. 5b), the processor 130 may fetch the previous weightings txw0 [1] to txw0[4] obtained at step 401, and may set the weightings txw[3,1,1], txw[3,1,2], txw[3,2,3] and txw[3,2,4] according to (or substantially equal to) the previous weightings txw0 [1] to txw0 [4] respectively. In a different embodiment, the processor 130 may respectively set the weightings txw[3,1,1], txw[3,1,2], txw[3,2,3] and txw[3,2,4] according to (or substantially equal to) the previous weightings txw[2,1,1] to txw[2,1,4] constructed at step 405 of the first iteration (FIG. 5a). In yet another embodiment, the processor 130 may set the weightings txw[3,1,1], txw[3,1,2], txw[3,2,3] and txw[3,2,4] according to (or substantially equal to) combination (e.g., linear combination) of the previous weightings txw[2,1,1] to txw[2,1,4] and txw0 [1] to txw0[4], e.g., the processor 130 may set the weighting txw[3,1,1] equal to a linear combination (weighted sum) of the previous weightings txw0 [1] and txw[2,1,1], etc.

In an embodiment according to FIG. 8b, at step 405 of the second iteration (FIG. 5b), the processor 130 may calculate the weightings txw[3,1,1] to txw[3,1,2] of the weighting vector txV[3,1] by solving a beamforming problem under a condition that the UE 10 only uses the antennas a[1] to a[2] (and the cooperating RF circuits rfc[1] to rfc[2]) to communicate, without using the rest antennas a[3] to a[12] and the rest RF circuits rfc[3] to rfc[16]. Similarly, the processor 130 may calculate the weightings txw[3,2,3] to txw[3,2,4] of the weighting vector txV[3,2] by solving a beamforming problem under a condition that the UE 10 only uses the antennas a[3] to a[4] (and the cooperating RF circuits rfc[3] to rfc[4]) to communicate, without using the rest antennas a[1] to a[2], a[5] to a[12] and the rest RF circuits rfc[1] to rfc[2], rfc[5] to rfc[16].

At step 407 of the second iteration (FIG. 5b), the processor 130 may calculate quality evaluations Q[3,1] and Q[3,2], as well as parameter evaluations P[3,1] and P[3,2], associated with the antenna subsets S[3,1] and S[3,2]. The processor 130 may calculate the quality evaluation Q[3,1] and the parameter evaluation P[3,1], being associated with the antenna subset S[3,1] which includes the antennas a[1] and a[2] cooperating with the associated RF circuits rfc[1] and rfc[2], under a condition that the UE 10 only uses the antennas a[1] and a[2] and the cooperating RF circuits rfc[1] and rfc[2], being weighted by the weightings txw[3,1,1] and txw[3,1,2], to communicate, without using the rest antennas a[3] to a[12] and the rest RF circuits rfc[3] to rfc[16]. Similarly, the processor 130 may calculate the quality evaluation Q[3,2] and the parameter evaluation P[3,2], being associated with the antenna subset S[3,2] which includes the antennas a[3] and a[4] cooperating with the associated RF circuits rfc[3] and rfc[4], under a condition that the UE 10 only uses the antennas a[3] and a[4] and the cooperating RF circuits rfc[3] and rfc[4], being weighted by the weightings txw[3,2,3] and txw[3,2,4], to communicate, without using the rest antennas a[1] to a[2], a[5] to a[12] and the rest RF circuits rfc[1] to rfc[2] and rfc[5] to rfc[16].

At step 409 of the second iteration (FIG. 5b), assuming that the quality evaluation Q[3,2] is better than the quality evaluation Q[3,1], so the processor 130 may select the antenna subset S[3,2], may update the parent set txS to be the selected antenna subset S[3,2], and may include the antenna subset S[3,2] in the candidate pool txCP. The candidate pool txCP may then include two antenna subsets S[2,1] and S[3,2] respectively selected at two iterations of step 409.

At step 411 of the second iteration (FIG. 5b), the processor 130 may determine whether to iterate back to step 405 to start another iteration. For convenience of discussion, it is assumed that the processor 130 decides to iterate step 405 for a third iteration, so the processor 130 may proceed to step 405 with the level index i updated to be four.

Figure 5C:
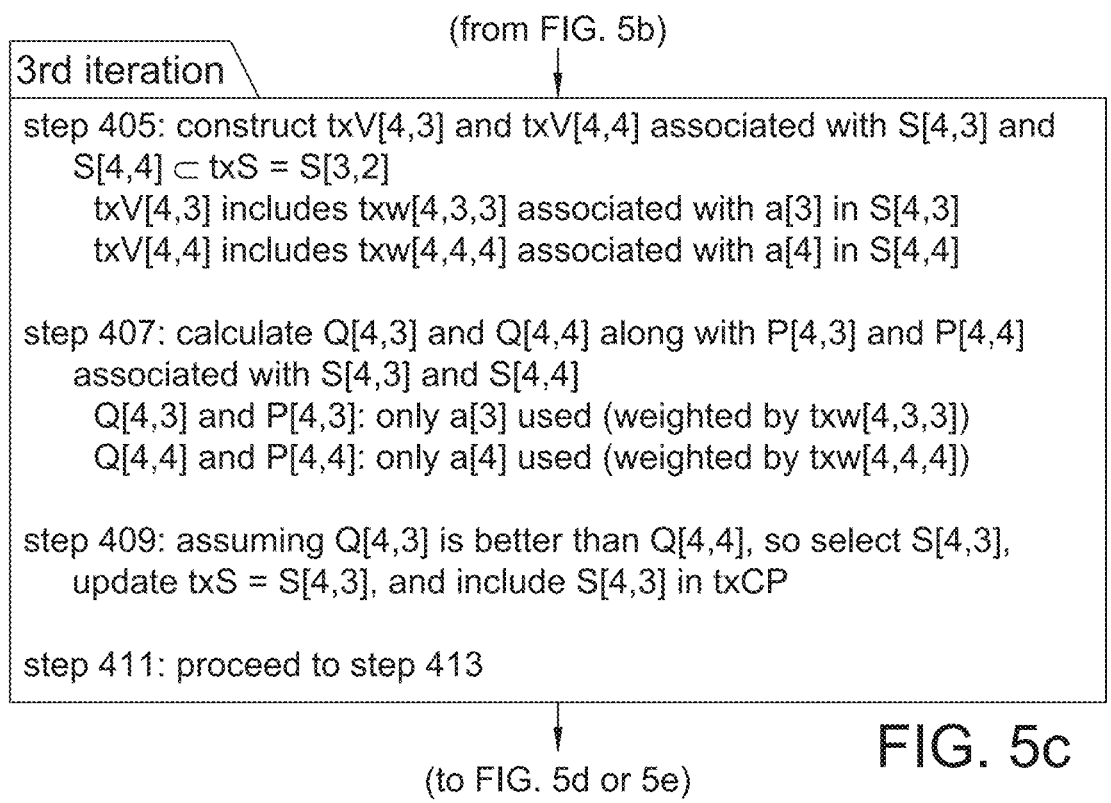

As shown in FIG. 5c, at step 405 of the third iteration, because the target set txS, which is updated to the antenna subset S[3,2], includes the antenna subsets S[4,3] and S[4,4] (FIG. 1), the processor 130 may construct weighting vectors txV[4,3] and txV[4,4] respectively associated with the antenna subsets S[4,3] and S[4,4]. The weighting vector txV[4,3], being associated with the antenna subset S[4,3] which includes the antenna a[3] cooperating with the RF circuits rfc[3], may include a weighting txw[4,3,3]. The weighting vector txV[4,4], being associated with the antenna subset S[4,4] which includes the antennas a[4] cooperating with the RF circuit rfc[4], may include a weighting txw[4,4,4].

Similar to step 405 of former iterations shown in FIGS. 5a and 5b, in an embodiment according to FIG. 8a, at step 405 of the third iteration (FIG. 5c), the processor 130 may fetch the previous weightings txw0[3] and txw0[4] obtained at step 401, and may set the weightings txw[4,3,3] and txw[4,4,4] according to (or substantially equal to) the previous weightings txw0[3] and txw0[4] respectively. In a different embodiment, the processor 130 may respectively set the weightings txw[4,3,3] and txw[4,4,4] according to (or substantially equal to) the previous weightings txw[3,2,3] and txw[3,2,4] included in the weighting vector txV[3,2] constructed at step 405 of the second iteration (FIG. 5b). In yet another embodiment, the processor 130 may respectively set the weightings txw[4,3,3] and txw[4,4,4] according to (or substantially equal to) the previous weightings txw[2,1,3] and txw[2,1,4] included in the weighting vector txV[2,1] constructed at step 405 of the first iteration (FIG. 5a). In still another embodiment, the processor 130 may respectively set the weightings txw[4,3,3] and txw[4,4,4] according to (or substantially equal to) combination (e.g., linear combination) of the previous weightings txw[2,1,3] and txw[2,1,4], txw[3,2,3] and txw[3,2,4], as well as txw0[3] and txw0[4]; e.g., the processor 130 may set the weighting txw[4,3,3] equal to a linear combination (weighted sum) of the previous weightings txw0[3], txw[2,1,3] and txw[3,2,3], etc.

In an embodiment according to FIG. 8b, at step 405 of the third iteration (FIG. 5c), the processor 130 may calculate the weighting txw[4,3,3] of the weighting vector txV[4,3] by solving a beamforming problem under a condition that the UE 10 only uses the antenna a[3] (and the cooperating RF circuit rfc[3]) to communicate, without using the rest antennas a[1] to a[2], a[4] to a[12] and the rest RF circuits rfc[1] to rfc[2], rfc[4] to rfc[16]; similarly, the processor 130 may calculate the weighting txw[4,4,4] of the weighting vector txV[4,4] by solving a beamforming problem under a condition that the UE 10 only uses the antenna a[4] (and the cooperating RF circuit rfc[4]) to communicate, without using the rest antennas a[1] to a[3], a[5] to a[12] and the rest RF circuits rfc[1] to rfc[3], rfc[5] to rfc[16].

At step 407 of the third iteration (FIG. 5c), the processor 130 may calculate quality evaluations Q[4,3] and Q[4,4], as well as parameter evaluations P[4,3] and P[4,4], associated with the antenna subsets S[4,3] and S[4,4]. The processor 130 may calculate the quality evaluation Q[4,3] and the parameter evaluation P[4,3], being associated with the antenna subset S[4,3] which includes the antenna a[3] cooperating with the associated RF circuit rfc[3], under a condition that the UE 10 only uses the antenna a[3] and the cooperating RF circuit rfc[3], being weighted by the weighting txw[4,3,3], to communicate, without using the rest antennas a[1] to a[2], a[4] to a[12] and the rest RF circuits rfc[1] to rfc[2] and rfc[4] to rfc[16]. Similarly, the processor 130 may calculate the quality evaluation Q[4,4] and the parameter evaluation P[4,4], being associated with the antenna subset S[4,4] which includes the antenna a[4] cooperating with the associated RF circuit rfc[4], under a condition that the UE 10 only uses the antenna a[4] and the cooperating RF circuit rfc[4], being weighted by the weighting txw[4,4,4], to communicate, without using the rest antennas a[1] to a[3], a[5] to a[12] and the rest RF circuits rfc[1] to rfc[3] and rfc[5] to rfc[16].

At step 409 of the third iteration, assuming that the quality evaluation Q[4,3] is better than the quality evaluation Q[4,4], the processor 130 may select the antenna subset S[4,3], may update the parent txS to the selected antenna subset S[4,3], may include the selected antenna subset S[4,3] to the candidate pool txCP, and may proceed to step 411. After step 409, the candidate pool txCP may include the antenna subsets S[2,1], S[3,2] and S[4,3] selected at three iterations of step 409.

At step 411, the processor 130 may determine whether to iterate back to step 405 to start another iteration. Since the level index i=4 already reaches the highest level of all the antenna subsets from the zeroth level antenna subset S[0,1] to the fourth level antenna subsets S[4,1] to S[4,12] (FIG. 1), the processor 130 may decide not to iterate step 405 again, and may proceed to step 413.

For convenience of discussion, in a first example of step 413 depicted in FIG. 5d, it is assumed that each of the parameter evaluations P[2,1], P[3,2] and P[4,3], which are respectively associated with the antenna subsets S[2,1], S[3,2] and S[4,3] included in the candidate pool txCP, meets the transmission operation requirement(s), so the processor 130 may select the antenna subset S[4,3] from the antenna subsets S[2,1], S[3,2] and S[4,3] because the antenna count (equal to 1) of the antenna subset S[4,3] is lower than the antenna counts (equal to 4 and 2 respectively) of the antenna subsets S[2,1] and S[3,2]. Then the processor 130 may cause the UE 10 to use the antenna a[3] included in the antenna subset S[4,3], along with the cooperating RF circuit rfc[3] weighted by the weighting txw[4,3,3] included in the weighting vector txV[4,3], for subsequent wireless communication (e.g., transmission); rest antennas a[1] to a[2], a[4] to a[12] and rest RF circuits rfc[1] to rfc[2], rfc[4] to rfc[16] may not be used, and the UE 10 may therefore reduce power consumption.

On the other hand, in a second example of step 413 depicted in FIG. 5e, it is assumed that the parameter evaluations P[4,3] fails to meet the transmission operation requirement(s) while the parameter evaluations P[2,1] and P[3,2] are checked to meet the transmission operation requirement, so the processor 130 may select the antenna subset S[3,2] from the compliant antenna subsets S[3,2] and S[2,1] because the antenna count of the antenna subset S[3,2] is lower than the antenna count of the antenna subset S[2,1]. Then the processor 130 may cause the UE 10 to use the antennas a[3] and a[4] included in the antenna subset S[3,2], along with the cooperating RF circuits rfc[3] and rfc[4] respectively weighted by the weightings txw[3,2,3] and txw[3,2,4] include in the weighting vector txV[3,2], for subsequent wireless communication (e.g., transmission); rest antennas a[1] to a[2], a[5] to a[12] and rest RF circuits rfc[1] to rfc[2], rfc[5] to rfc[16] may not be used, so the UE 10 may decrease power consumption.

Figure 6:
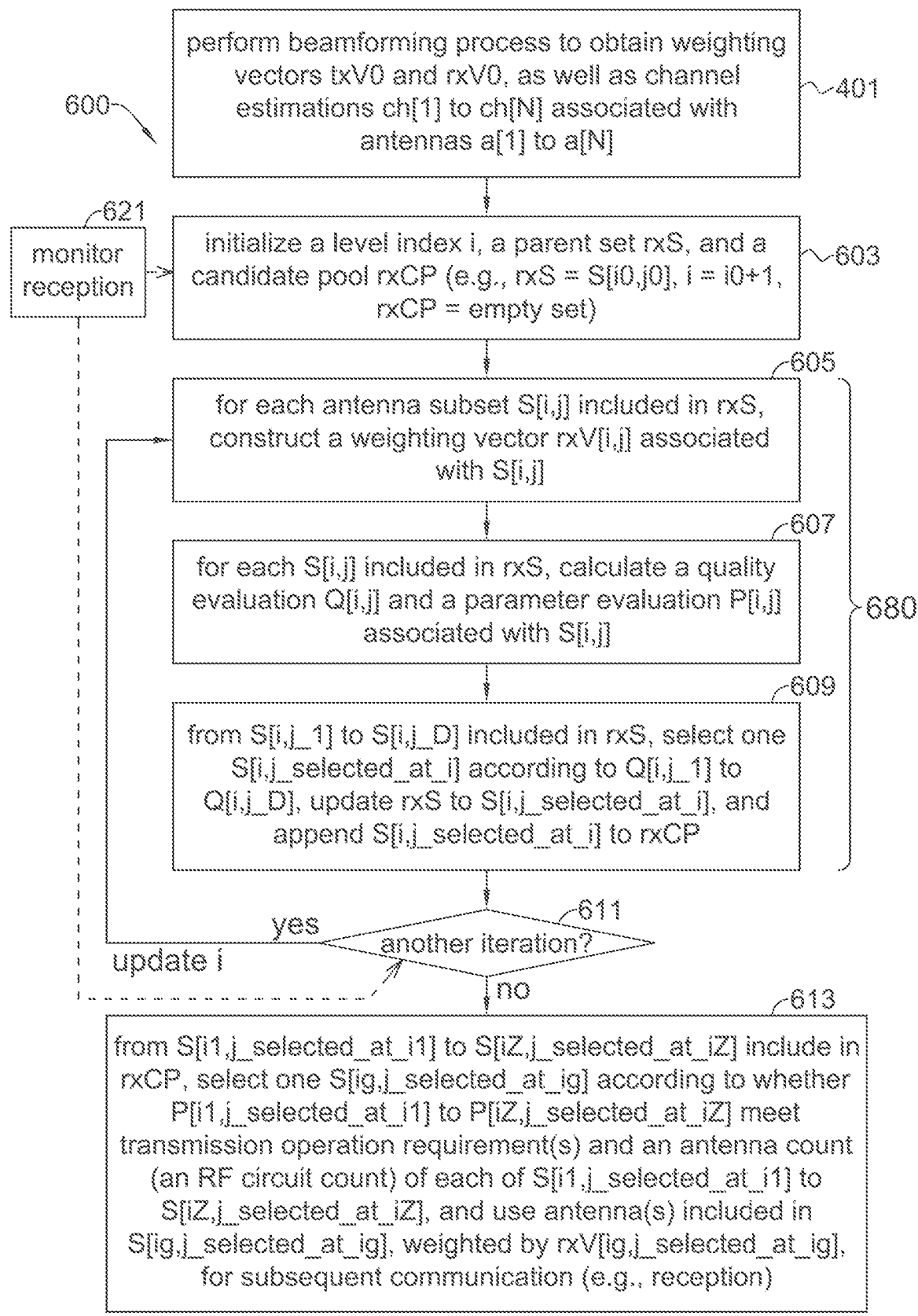
FIG. 6 depicts a flowchart of reception antenna selection according to an embodiment of the invention.

FIG. 6 depicts a flowchart 600 according to an embodiment of the invention. The processor 130 (FIG. 1) may control the UE 10 to adopt the flowchart 600 to select antenna(s) for wireless reception. The flowchart 600 may comprise steps 401, 603, 605, 607, 609, 611 and 613, wherein steps 605, 607 and 609 may be referred to as a reception antenna preliminary selection procedure 680 which may iterate one or more times for hierarchical selection. Steps of the flowchart 600 may be described as follows.

Step 603: after step 401 which is described by referring to FIG. 4, the processor 130 may initialize a level index i, a parent set rxS and a candidate pool rxCP. For example, assuming that the processor 130 aims to systematically select fewer antenna(s) for reception from an i0-th level antenna subsets S[i0,j0] with indices i0 and j0 respectively being one of 1 to N and one of 1 to J[i0] (FIG. 2) and the antenna subset S[i0,j0] including one or more antennas cooperating with one or more RF circuits rfc[ki_1] to rfc[ki_U] for indices ki_1 to ki_U being different ones of 1 to K if U>1, then the processor 130 may set the index i to be larger than the index i0 (e.g., to equal (i0+1)), may set the parent set rxS to equal the antenna subset S[i0,j0], and may set the candidate pool rxCP to an empty set.

Step 605: for each i-th level antenna subset S[i,j] that is a subset of the parent set rxS, the processor 130 of the UE 10 may construct a weighting vector rxV[i,j] as a present-level weighting vector associated with the antenna subset S[i,j]. Step 605 may be referred to as a weighting construction step.

For example, assuming that the parent set rxS includes one or more i-th level antenna subsets S[i,j_1] to S[i,j_D] (for indices j_1 to j_D being different ones of 1 to J[i] if D>1) as its subset(s), then the processor 130 may construct one or more weighting vectors rxV[i,j_1] to rxV[i,j_D] respectively associated with the one or more antenna subsets S[i,j_1] to S[i,j_D]. As each antenna subset S[i,j_d] (for index j_d being each of j_1 to j_D) may include one or more antennas a[n_1] to a[n_H] cooperating with one or more RF circuits rfc[k_1] to rfc[k_M] (for indices n_1 to n_H being different ones of 1 to N if H>1, and indices k_1 to k_M being different ones of 1 to K if M>1), each weighting vector rxV[i,j_d] associated with the antenna subset S[i,j_d] may include one or more weightings rxw[i,j_d,k_1] to rxw[i,j_d, k_M] respectively for the RF circuits rfc[k_1] to rfc[k_M] cooperating with the one or more antennas a[n_1] to a[n_H] included in the antenna subset S[i,j_d].

FIG. 9a depicts an embodiment of the weighting construction at step 605. To construct the weighting vector rxV[i,j_d] associated with the antenna subset S[i,j_d] which includes the one or more antennas a[n_1] to a[n_H] cooperating with the one or more RF circuits rfc[k_1] to rfc [k_M], the processor 130 of the UE 10 may fetch one or more previous weightings, such as the weightings rxw0 [k_1] to rwx0[k_M] from the weightings rxw0 [1] to rxw0 [K] of the weighting vector rxV0 (step 401), and may set the one or more weightings rxw[i,j_d,k_1] to rxw[i,j_d,k_M] included in the weighing vector rxV[i,j_d] according to the one or more previous weightings rxw0[k_1] to rxw0[k_M]. For example, the processor 130 may set the one or more weightings rxw[i,j_d,k_1] to rxw[i,j_d,k_M] to substantially equal the one or more previous weightings rxw0[k_1] to rxw0[k_M].

When constructing the one or more weightings rxw[i,j_d, k_1] to rxw[i,j_d, k_M] of the weighting vector rxV[i,j_d] according to one or more previous weightings, the one or more previous weightings may also be one or more weightings rxw[i',j',k_1] to rxw[i',j',k_M] included in a weighting vector rxV[i',j'] constructed at step 605 of a past iteration (if exists), with index i' being one of 1 to I (FIG. 2) and unequal to (e.g., smaller than) the current level index i, index j' being one of 1 to J[i'] (FIG. 2), and the weighting vector rxV[i',j'] being associated with an antenna subset S[i',j'] which may be a subset of the antenna subset S[i0,j0] (step 603), and may include the antenna subset S[i,j_d]. The one or more previous weightings rxw0[k_1] to rxw0[k_M] or rxw[i',j',k_1] to rxw[i',j',k_M] may be respectively associated with the one or more RF circuits rfc[k_1] to rfc[k_M] cooperating with the one or more antennas a[n_1] to a[n_H] included in the associated antenna subset S[i,j_d], and may be obtained and recorded (e.g., at step 401 or at step 605 of a previously iteration) before the weighting construction step 605 of current iteration.

FIG. 9b depicts another embodiment of weighting construction at step 605. To constructing the weighting vector rxV[i,j_d] associated with the antenna subset S[i,j_d] which includes the one or more antennas a[n_1] to a[n_H] cooperating with the one or more RF circuits rfc[k_1] to rfc[k_M], the processor 130 of the UE 10 may calculate the one or more weightings rxw[i,j_d,k_1] to rxw[1,j_d,k_M] included in the weighting vector rxV[i,j_d] by solving a beamforming optimization problem under a condition that the UE 10 only uses the one or more antennas a[n_1] to a[n_H] of the antenna set 100 (FIG. 2) and the associated one or more RF circuits rfc[k_1] to rfc[k_M] to communicate, without using rest antenna(s) of the antenna set 100 and rest RF circuit(s) of the RF circuit set 110.

Step 607 (FIG. 6): for each i-th level antenna subset S[i,j] that is a subset of the parent set rxS, the processor 130 of the UE 10 may calculate a quality evaluation Q[i,j] and a parameter evaluation P[i,j] associated with the antenna subset S[i,j]. Step 607 may be referred to as a quality evaluation step. The quality evaluation Q[i,j] may comprise one or more communication qualities, and may be calculated under a condition that UE 10 communicates only using the antenna(s) included in the antenna subset S[i,j] and the cooperating RF circuit(s), without using the antenna(s) not included in the antenna subset S[i,j] and the cooperating RF circuit(s). In an embodiment, the one or more communication qualities in each quality evaluation Q[i,j] associated with the antenna subset S[i,j] may relate to one or more of the following: reference signal received power (RSRP), reference signal received quality (RSRQ), received signal strength indicator (RSSI) and signal to interference and noise ratio (SINR), as well as other quantity or quantities which may reflect channel quality and/or communication quality between the antenna subset S[i,j] and the remote participant. The parameter evaluation P[i,j] may quantitatively reflect one or more operation parameters of the UE 10 when the UE 10 communicates (e.g., receives) only using the antenna(s) included in the antenna subset S[i,j], without using the antenna(s) not included in the antenna subset S[i,j].

As the parent set rxS (step 605) may include the one or more i-th level antenna subsets S[i,j_1] to S[i,j_D] (for indices j_1 to j_D being different ones of 1 to J[i] if D>1) as its subset(s), the processor 130 of the UE 10 may calculate one or more quality evaluations Q[i,j_1] to Q[i,j_D] and one or more parameter evaluations P[i,j_1] to P[i,j_D] respectively associated with the one or more antenna subsets S[i,j_1] to S[i,j_D]. Based on the channel estimations ch[1] to ch[N] (step 401) associated with the antennas a[1] to a[N] of the antenna set 100, the processor 130 of the UE 10 may calculate the quality evaluation Q[i,j_d] and the parameter evaluation P[i,j_d] (for index j_d being each one of j_1 to j_D), which are associated with the antenna subset S[i,j_d] including the one or more antennas a[n_1] to a[n_H] cooperating with the one or more RF circuits rfc[k_1] to rfc[k_M], under a condition that the UE 10 only uses the one or more antennas a[n_1] to a[n_H] and the associated one or more cooperating RF circuits rfc[k_1] to rfc[k_M], which are weighted by the one or more weightings rxw[i,j_d,k_1] to rxw[i,j_d,k_M] included in the weighting vector rxV[i,j_d] associated with the antenna subset S[i,j_d] (step 605), to communicate (e.g., to receive), without using rest antenna(s) of the antenna set 100 and rest RF circuit(s) of the RF circuit set 110. In other words, the processor 130 of the UE 10 may calculate the quality evaluation Q[i,j_d] and the parameter evaluation P[i,j_d], which are associated with the antenna subset S[i,j_d] including the one or more antennas a[n_1] to a[n_H] cooperating with the one or more RF circuits rfc[k_1] to rfc[k_M], under a condition that the UE 10 only uses the one or more antennas a[n_1] to a[n_H] and the cooperating one or more RF circuits rfc[k_1] to rfc[k_M] to communicate, with the one or more RF circuits rfc[k_1] to rfc[k_M] respectively adopting the one or more weightings rxw[i,j_d,k_1] to rxw[i,j_d,k_M] included in the constructed weighting vector rxV[i,j_d] (step 605) as one or more weightings rxW[k_1] to rxW[k_M] (FIG. 2 or 3) of the one or more RF circuits rfc[k_1] to rfc[k_M], and with rest antenna(s) of the antenna set 100 and rest RF circuit(s) of the RF circuit set 110 not being used.

Step 609: according to the quality evaluation(s) associated with the antenna subset(s) in the parent set rxS, the processor 130 may select one of the antenna subset(s) included in the parent set rxS, may update the parent set rxS to the selected antenna subset, and may include the selected antenna subset in the candidate pool rxCP. Then processor 130 may proceed to step 611. Step 609 may be referred to as a preliminary selection step. As the parent set rxS may include the one or more antenna subsets S[i,j_1] to S[i,j_D], the processor 130 may select one of the one or more antenna subsets S[i,j_1] to S[i,j_D] according to the quality evaluations Q[i,j_1] to Q[i,j_D] respectively associated with the antenna subsets S[i,j_1] to S[i,j_D]. For example, the processor 130 may select an antenna subset S[i,j_selected_at_i] from the one or more antenna subsets S[i,j_1] to S[i,j_D] (with index j_selected_at_i being one of j_1 to j_D) if the quality evaluation Q[i,j_selected_at_i] associated with the antenna subset S[i,j_selected_at_i] is the best among the quality evaluations Q[i,j_1] to Q[i,j_D]. Then the processor 130 may update the parent set rxS to the selected antenna subset S[i,j_selected_at_i], and may include the selected antenna subset S[i,j_selected_at_i] in the candidate pool rxCP, e.g., may append the antenna subset S[i,j_selected_at_i] to the candidate pool rxCP.

Step 611: the processor 130 may determine whether to run another iteration of the reception antenna preliminary selection procedure 680. If the processor 130 determines to run another iteration, the processor 130 may iterate back to step 605 with the level index i updated to another value. On the other hand, if the processor 130 determines not to run another iteration, the processor may proceed to step 613. The processor 130 may determine whether to run another iteration of the reception antenna preliminary selection procedure 680 according to one or more considerations, e.g., whether the index i is below a predefined iteration threshold, and/or whether the quality evaluation Q[i,j_selected_at_i] associated with the selected antenna subset S[i,j_selected_at_i] at step 609 is still in a predefined acceptable quality range (e.g., is better than a predefined quality threshold), etc. In addition, the processor 130 may determine whether to run another iteration further according to result of step 621 which will be described later.

Step 613: after one or more iterations of the reception antenna preliminary selection procedure 680, the candidate pool txCP may include one or more antenna subsets S[i1,j_selected_at_i1] to S[iZ,j_selected_at_iZ] (with indices i1 to iZ being different ones of 1 to I if Z>1) resulting from the one or more iterations of step 609 respectively. With the one or more antenna subsets S[i1,j_selected_at_i1] to S[iZ,j_selected_at_iZ] being associated with one or more parameter evaluations P[i1,j_selected_at_i1] to P[iZ,j_selected_at_iZ] calculated at one or more iterations of step 607 respectively, the processor 130 may select one of the one or more antenna subsets S[i1,j_selected_at_i1] to S[iZ,j_selected_at_iZ] according to whether each of the one or more parameter evaluations P[i1,j_selected_at_i1] to P[iZ,j_selected_at_iZ] meets one or more reception operation requirements, and according to the antenna count (and/or an RF circuit count) of each of the one or more antenna subsets S[i1,j_selected_at_i1] to S[iZ,j_selected_at_iZ].

For example, in an embodiment, the processor 130 may pick one or more compliant antenna subsets S[#1,j_selected_at_#1] to S[#G,j_selected_at_#G] from the one or more antenna subsets S[i1,j_selected_at_i1] to S[iZ,j_selected_at_iZ] included in the candidate pool rxCP, with indices #1 to #G being different ones of i1 to iZ if G>1. For each antenna subset S[iz,j_selected_at_iz] (with index iz being each of i1 to iZ) included in the candidate pool rxCP, the processor 130 may pick the antenna subset S[iz,j_selected_at_iz] as a compliant antenna subset if the associated parameter evaluation P[iz,j_selected_at_iz] meets the reception operation requirement(s), and may not pick the antenna subset S[iz, j_selected_at_iz] as a compliant antenna subset if the associated parameter evaluation P[iz,j_selected_at_iz] does not meet the reception operation requirement(s). Then, the processor 130 may select an antenna subset with the lowest antenna count (and/or RF count) from the one or more compliant antenna subsets S[#1,j_selected_at_#1] to S[#G, j_selected_at_#G]. For example, the processor 130 may select an antenna subset S[ig,j_selected_at_ig] (for index ig being one of #1 to #G) from the one or more compliant antenna subsets S[#1,j_selected_at_#1] to S[#G, j_selected_at_#G] if the antenna count (and/or the RF circuit count) of the antenna subset S[ig,j_selected_at_ig] is the lowest among the one or more antenna counts of the one or more antenna subsets S[#1,j_selected_at_#1] to S[#G, j_selected_at_#G]. After selecting the antenna subset S[ig, j_selected_at_ig], the processor 130 may control the UE 10 to use the antenna(s) included in the selected antenna subset S[ig,j_selected_at_ig], along with the RF circuit(s) cooperating with the antenna(s) included in the antenna subset S[ig,j_selected_at_ig] being weighted by the weighting(s) included in the associated weighting vector rxV[ig,j_selected_at_ig], for subsequent wireless communication (e.g., reception); rest antenna(s) (i.e., antenna(s) other than the antenna(s) included in the selected antenna subset S[ig, j_selected_at_ig]), along with the RF circuit(s) cooperating with the rest antenna(s), may not be used.

Step 621: the processor 130 may monitor one or more reception qualities as the flowchart 600 is running, and may determine whether to execute steps 605 and 607 from steps 603 and/or 611 according to the one or more reception qualities. In an embodiment, the one or more reception qualities may relate to one or more of the following: channel quality, receiving quality, throughput, runtime power consumption, whether downlink data transmission type is dense or sparse, and type of current user software application (app), etc. In an embodiment, the processor 130 may further determine what value the level index i should be updated to when iterating step 605 from step 611.

For example, in an embodiment, when the one or more reception qualities reflect that the channel quality is good, downlink data is sparse, and/or currently running app(s) of the UE 10 is (are) not hungry for web access, the processor 130 may determine to start step 603 with a higher level index i and/or a smaller parent set rxS which includes fewer antennas, and/or may determine to iterate step 605 from step 611 with the level index i incremented, so the processor 130 may decrease the antenna count and the associated RF circuit count used for reception. As another example, in an embodiment, when the one or more reception qualities reflect that the channel quality is not good, downlink data is dense and/or currently running app(s) of the UE 10 is (are) hungry for web access, the processor 130 may determine to start step 603 with a lower level index i and/or a larger parent set rxS which includes more antennas, and/or may determine to iterate step 605 from step 611 with the level index i decremented, so the processor 130 may increase the antenna count and the associated RF circuit count used for reception; or, at step 611, the processor 130 may determine not to iterate step 605 after step 611, and may then stop seeking further reduction of the antenna count and the associated RF circuit count used for reception. In other words, the processor 130 may dynamically and adaptively increase or decrease the antenna count and the associated RF circuit count used for reception according to reception monitoring result of step 621.

In the flowchart 600, reaching step 613 from step 603 may indicate capability to reduce the antenna count (and RF circuit count) used to receive, since the antenna subset S[ig,j_selected_at_ig] selected at step 615 is only a subset of the parent set rxS at step 603.

It is noted that there may be various embodiments to express the flowchart 600 in FIG. 6, the aforementioned expression of the flowchart 600 may just be one of the embodiments. The flowchart 600 may have more or fewer steps.

Figure 7B:
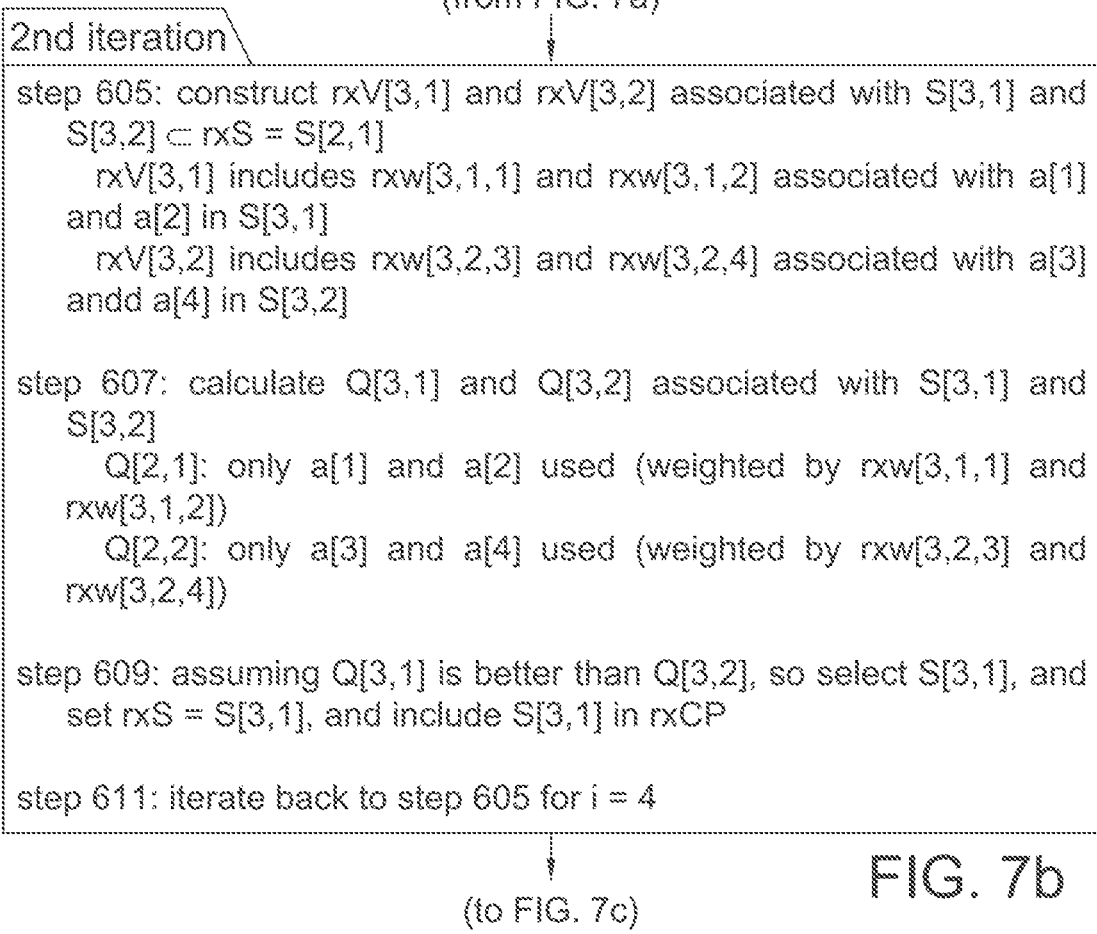

FIGS. 7a to 7c depict an example of applying the flowchart 600 in FIG. 6 to the UE 10 in FIG. 1. As shown in FIG. 7a, at step 401, the processor 130 (FIG. 1) may obtain the reception weighting vector rxV0 after the beamforming process. The weighting vector rxV0 may include the weightings rxw0[1] to rxw0[16] associated with the RF circuits rfc[1] to rfc[16] (FIG. 1) cooperating with the antennas a[1] to a[12], and may be calculated under a condition that all the antennas a[1] to a[12] and all the RF circuits rfc[1] to rfc[16] are used to communicate.

At step 603, the processor 130 may set the level index i to two, may set the parent set rxS to the first level antenna subset S[1,1] which includes the antennas a[1] to a[6] cooperating with the RF circuits rfc[1] to rfc[8] (FIG. 1), and may set the candidate pool rxCP to be an empty set. By setting the parent set rxS to the antenna subset S[1,1], the processor 130 may select between the second level antenna subsets S[2,1] and S[2,2] which are the subsets of the antenna subset S[1,1] by a first iteration of the reception antenna preliminary selection procedure 680.

At step 605, the processor 130 may construct the weighting vectors rxV[2,1] and rxV[2,2] respectively associated with the antenna subsets S[2,1] and S[2,2]. The weighting vector rxV[2,1], being associated with the antenna subset S[2,1] which may include the antennas a[1] to a[4] cooperating with the RF circuits rfc[1] to rfc[4], may include weightings rxw[2,1,1] to rxw[2,1,4] respectively associated with the RF circuits rfc[1] to rfc[4]. The weighting vector rxV[2,2], being associated with the antenna subset S[2,2] which may include the antennas a[5] to a[6] cooperating with the RF circuits rfc[5] to rfc[8], may include weightings rxw[2,2,5] to rxw[2,2,8] respectively associated with the RF circuits rfc[5] to rfc[8].

As described by referring to FIGS. 9a and 9b, there may be various embodiments to construct the weighting vectors rxV[2,1] and rxV[2,2] at step 605 (FIG. 7a). According to FIG. 9a, in an embodiment of constructing the weighting vectors rxV[2,1] and rxV[2,2], the processor 130 may fetch the weightings rxw0[1] to rxw0[4] and rxw0[5] to rxw0[8] obtained at step 401, and may set values of the weightings rxw[2,1,1] to rxw[2,1,4] of the weighting vector rxV[2,1] and values of the weightings rxw[2,2,5] to rxw[2,2,8] of the weighting vector rxV[2,2] according to the weightings rxw0 [1] to rxw0 [4] and rxw0 [5] to rxw0 [8] respectively; e.g., may set the weightings rxw[2,1,1] to rxw[2,1,4] and rxw[2, 2,5] to rxw[2,2,8] to substantially equal the weightings rxw0[1] to rxw0[4] and rxw0[5] to rxw0[8] respectively.

According to FIG. 9b, in an embodiment of constructing the weighting vectors rxV[2,1] and rxV[2,2], the processor 130 may calculate the weightings rxw[2,1,1] to rxw[2,1,4] of the weighting vector rxV[2,1] by solving a beamforming problem under a condition that the UE 10 only uses the antennas a[1] to a[4] (and the cooperating RF circuits rfc[1] to rfc[4]) to communicate, without using the rest antennas a[5] to a[12] and the rest RF circuits rfc[5] to rfc[16]. Similarly, the processor 130 may calculate the weightings rxw[2,2,5] to rxw[2,2,8] of the weighting vector rxV[2,2] by solving a beamforming problem under a condition that the UE 10 only uses the antennas a[5] to a[6] (and the cooperating RF circuits rfc[5] to rfc[8]) to communicate, without using the rest antennas a[1] to a[4], a[7] to a[12] and the rest RF circuits rfc[1] to rfc[4] and rfc[9] to rfc[16].

In yet another embodiment of constructing the weighting vectors rxV[2,1] and rxV[2,2], the processor 130 may set the weightings rxw[2,1,1] to rxw[2,1,4] of the weighting vector rxV[2,1] according to FIG. 9a, and may calculate the weightings rxw[2,2,5] to rxw[2,2,8] of the weighting vector rxV[2,2] according to FIG. 9b; alternatively, the processor 130 may calculate the weightings rxw[2,1,1] to rxw[2,1,4] of the weighting vector rxV[2,1] according to FIG. 9b, and may set the weightings rxw[2,2,5] to rxw[2,2,8] of the weighting vector rxV[2,2] according to FIG. 9a.

At step 607 (FIG. 7a), the processor 130 may calculate the quality evaluations Q[2,1] and Q[2,2], along with the parameter evaluations P[2,1] and P[2,2], associated with the antenna subsets S[2,1] and S[2,2], respectively. The quality evaluation Q[2,1] and the parameter evaluation P[2,1], being associated with the antenna subset S[2,1] which may include the antennas a[1] to a[4] cooperating with the RF circuits rfc[1] to rfc[4], may be calculated under a condition that the UE 10 only uses the antennas a[1] to a[4] and the cooperating RF circuits rfc[1] to rfc[4] to communicate, with the RF circuits rfc[1] to rfc[4] weighted by the weightings rxw[2,1,1] to rxw[2,1,4], and without using the rest antennas a[5] to a[12] and the rest RF circuits rfc[5] to rfc[16]. The quality evaluation Q[2,2] and the parameter evaluation P[2,2], being associated with the antenna subset S[2,2] which may include the antennas a[5] to a[6] cooperating with the RF circuits rfc[5] to rfc[8], may be calculated under a condition that the UE 10 only uses the antennas a[5] to a[6] and the cooperating RF circuits rfc[5] to rfc[8] to communicate, with the RF circuits rfc[5] to rfc[8] weighted by the weightings rxw[2,2,5] to rxw[2,2,8], and without using the rest antennas a[1] to a[4], a[7] to a[12] and the rest RF circuits rfc[1] to rfc[4] and rfc[9] to rfc[16].

At step 609, the processor 130 may select one of the antenna subsets S[2,1] and S[2,2] by comparing the associated quality evaluations Q[2,1] and Q[2,2]. For convenience of discussion, it is assumed that the quality evaluation Q[2,1] is better than the quality evaluation Q[2,2], so the processor 130 may select the antenna subset S[2,1] associated with the quality evaluation Q[2,1], may update the parent set rxS to be the selected antenna subset S[2,1], and may include the antenna subset S[2,1] in the candidate pool rxCP. Then the processor 130 may proceed to step 611.

At step 611, the processor 130 may determine whether to iterate back to step 605. For convenience of discussion, it is assumed that the processor 130 decides to proceed back to step 605 for a second iteration, with the level index i updated to three.

As shown in FIG. 7b, at step 605 of the second iteration, because the parent set rxS, which is updated to the antenna subset S[2,1] at step 615 of the first iteration (FIG. 7a), includes two antenna subsets S[3,1] and S[3,2], the processor 130 may construct weighting vectors rxV[3,1] and rxV[3,2] respectively associated with the antenna subsets S[3,1] and S[3,2]. The weighting vector rxV[3,1], being associated with the antenna subset S[3,1] which includes the antennas a[1] to a[2] cooperating with the RF circuits rfc[1] to rfc[2], may include weightings rxw[3,1,1] and rxw[3,1,2]. The weighting vector rxV[3,2], being associated with the antenna subset S[3,2] which includes the antennas a[3] to a[4] cooperating with the RF circuits rfc[3] to rfc[4], may include weightings rxw[3,2,3] and rxw[3,2,4].

Similar to step 605 of the first iteration (FIG. 7a), in an embodiment according to FIG. 9a, at step 605 of the second iteration (FIG. 7b), the processor 130 may fetch the previous weightings rxw0 [1] to rxw0 [4] obtained at step 401, and may set the weightings rxw[3,1,1], rxw[3,1,2], rxw[3,2,3] and rxw[3,2,4] according to (or substantially equal to) the previous weightings rxw0[1] to rxw0[4] respectively. In a different embodiment, the processor 130 may set the weightings rxw[3,1,1], rxw[3,1,2], rxw[3,2,3] and rxw[3,2,4] according to (or substantially equal to) the previous weightings rxw[2,1,1] to rxw[2,1,4] constructed at step 605 of the first iteration (FIG. 7a), respectively. In yet another embodiment, the processor 130 may set the weightings rxw[3,1,1], rxw[3,1,2], rxw[3,2,3] and rxw[3,2,4] according to (or substantially equal to) combination (e.g., linear combination) of the previous weightings rxw[2,1,1] to rxw[2,1,4] and rxw0 [1] to rxw0[4]; e.g., the processor 130 may set the weighting rxw[3,1,1] equal to a linear combination (weighted sum) of the previous weightings rxw0 [1] and rxw[2,1,1], etc.

In an embodiment according to FIG. 9b, at step 605 of the second iteration (FIG. 7b), the processor 130 may calculate the weightings rxw[3,1,1] to rxw[3,1,2] of the weighting vector rxV[3,1] by solving a beamforming problem under a condition that the UE 10 only uses the antennas a[1] to a[2] (and the cooperating RF circuits rfc[1] to rfc[2]) to communicate, without using the rest antennas a[3] to a[12] and the rest RF circuits rfc[3] to rfc[16]. Similarly, the processor 130 may calculate the weightings rxw[3,2,3] to rxw[3,2,4] of the weighting vector rxV[3,2] by solving a beamforming problem under a condition that the UE 10 only uses the antennas a[3] to a[4] (and the cooperating RF circuits rfc[3] to rfc[4]) to communicate, without using the rest antennas a[1] to a[2], a[5] to a[12] and the rest RF circuits rfc[1] to rfc[2], rfc[5] to rfc[16].

At step 607 of the second iteration (FIG. 7b), the processor 130 may calculate quality evaluations Q[3,1] and Q[3,2], as well as parameter evaluations P[3,1] and P[3,2], associated with the antenna subsets S[3,1] and S[3,2]. The processor 130 may calculate the quality evaluation Q[3,1] and the parameter evaluation P[3,1], being associated with the antenna subset S[3,1] which includes the antennas a[1] and a[2] cooperating with the associated RF circuits rfc[1] and rfc[2], under a condition that the UE 10 only uses the antennas a[1] and a[2] and the cooperating RF circuits rfc[1] and rfc[2], being weighted by the weightings rxw[3,1,1] and rxw[3,1,2], to communicate, without using the rest antennas a[3] to a[12] and the rest RF circuits rfc[3] to rfc[16]. Similarly, the processor 130 may calculate the quality evaluation Q[3,2] and the parameter evaluation P[3,2], being associated with the antenna subset S[3,2] which includes the antennas a[3] and a[4] cooperating with the associated RF circuits rfc[3] and rfc[4], under a condition that the UE 10 only uses the antennas a[3] and a[4] and the cooperating RF circuits rfc[3] and rfc[4], being weighted by the weightings rxw[3,2,3] and rxw[3,2,4], to communicate, without using the rest antennas a[1] to a[2], a[5] to a[12] and the rest RF circuits rfc[1] to rfc[2] and rfc[5] to rfc[16].

At step 609 of the second iteration, the processor 130 may select one of the antenna subsets S[3,1] and S[3,2] by comparing the associated quality evaluations Q[3,1] and Q[3,2]. For convenience of discussion, it is assumed that the quality evaluation Q[3,1] is better than the quality evaluation Q[3,2], so the processor 130 may select the antenna subset S[3,1] associated with the quality evaluation Q[3,1], may update the parent set rxS by the selected antenna subset S[3,1], may append the antenna subset S[3,1] to the candidate pool rxCP, and may proceed to step 611.

At step 617 of the second iteration (FIG. 7*b*), the processor 130 may determine whether to iterate back to step 605 to start another iteration. For convenience of discussion, it is assumed that the processor 130 decides to iterate step 605 for a third iteration, so the processor 130 may proceed to step 605 with the level index i updated to four.

As shown in FIG. 7*c*, at step 605 of the third iteration, because the parent set rxS, which is updated to the antenna subset S[3,1], includes the antenna subsets S[4,1] and S[4,2] (FIG. 1), the processor 130 may construct weighting vectors rxV[4,1] and rxV[4,2] respectively associated with the antenna subsets S[4,1] and S[4,2]. The weighting vector rxV[4,1], being associated with the antenna subset S[4,1] which includes the antenna a[1] cooperating with the RF circuits rfc[1], may include a weighting rxw[4,1,1]. The weighting vector rxV[4,2], being associated with the antenna subset S[4,2] which includes the antennas a[2] cooperating with the RF circuit rfc[2], may include a weighting rxw[4,2,2].

Similar to step 605 of former iterations shown in FIGS. 7*a* and 7*b*, in an embodiment according to FIG. 9*a*, at step 605 of the third iteration (FIG. 7*c*), the processor 130 may fetch the previous weightings rxw0 [1] and rxw0 [2] obtained at step 401, and may set the weightings rxw[4,1,1] and rxw[4,2,2] according to (or substantially equal to) the previous weightings rxw0 [1] and rxw0 [2], respectively. In a different embodiment, the processor 130 may respectively set the weightings rxw[4,1,1] and rxw[4,2,2] according to (or substantially equal to) the previous weightings rxw[3,1,1] and rxw[3,1,2] in the weighting vector rxV[3,1] constructed at step 605 of the second iteration (FIG. 7*b*). In yet another embodiment, the processor 130 may respectively set the weightings rxw[4,1,1] and rxw[4,2,2] according to (or substantially equal to) the previous weightings rxw[2,1,1] and rxw[2,1,2] in the weighting vector rxV[2,1] constructed at step 605 of the first iteration (FIG. 7*a*). In still another embodiment, the processor 130 may set the weightings rxw[4,1,1] and rxw[4,2,2] according to (or substantially equal to) combination (e.g., linear combination) of the previous weightings rxw[2,1,1] and rxw[2,1,2], rxw[3,1,1] and rxw[3,1,2], as well as rxw0 [1] and rxw0[2]; e.g., the processor 130 may set the weighting rxw[4,1,1] equal to a linear combination (weighted sum) of the previous weightings rxw0 [1], rxw[2,1,1] and rxw[3,1,1], etc.

In an embodiment according to FIG. 9*b*, at step 605 of the third iteration (FIG. 7*c*), the processor 130 may calculate the weighting rxw[4,1,1] of the weighting vector rxV[4,1] by solving a beamforming problem under a condition that the UE 10 only uses the antenna a[1] (and the cooperating RF circuit rfc[1]) to communicate, without using the rest antennas a[2] to a[12] and the rest RF circuits rfc[2] to rfc[16]. Similarly, the processor 130 may calculate the weighting rxw[4,2,2] of the weighting vector rxV[4,2] by solving a beamforming problem under a condition that the UE 10 only uses the antenna a[2] (and the cooperating RF circuit rfc[2]) to communicate, without using the rest antennas a[1] and a[3] to a[12] and the rest RF circuits rfc[1] and rfc[3] to rfc[16].

At step 607 of the third iteration (FIG. 7*c*), the processor 130 may calculate quality evaluations Q[4,1] and Q[4,2], along with parameter evaluations P[4,1] and P[4,2], associated with the antenna subsets S[4,1] and S[4,2]. The processor 130 may calculate the quality evaluation Q[4,1], being associated with the antenna subset S[4,1] which includes the antenna a[1] cooperating with the associated RF circuit rfc[1], under a condition that the UE 10 only uses the antenna a[1] and the cooperating RF circuit rfc[1], being weighted by the weighting rxw[4,1,1], to communicate, without using the rest antennas a[2] to a[12] and the rest RF circuits rfc[2] to rfc[16]. Similarly, the processor 130 may calculate the quality evaluation Q[4,2], being associated with the antenna subset S[4,2] which includes the antenna a[2] cooperating with the associated RF circuit rfc[2], under a condition that the UE 10 only uses the antenna a[2] and the cooperating RF circuit rfc[2], being weighted by the weighting rxw[4,2,2], to communicate, without using the rest antennas a[1], a[3] to a[12] and the rest RF circuits rfc[1] and rfc[3] to rfc[16].

As shown in FIG. 7*c*, at step 609 of the third iteration, the processor 130 may select one of the antenna subsets S[4,1] and S[4,2] by comparing the associated quality evaluations Q[4,1] and Q[4,2]. For convenience of discussion, it is assumed that the quality evaluation Q[4,1] is better than the quality evaluation Q[4,2], so the processor 130 may select the antenna subset S[4,1] associated with the quality evaluation Q[4,1], may update the parent set rxS by the selected antenna subset S[4,1], may append the antenna subset S[4,1] to the candidate pool rxCP, and may proceed to step 611. After three iterations of step 609, the candidate pool rxCP may include the antenna subsets S[2,1], S[3,1] and S[4,1].

As shown in FIG. 7*c*, at step 611 of the third iteration, the processor 130 may determine whether to iterate back to step 605 to start another iteration. Since the level index i=4 already reaches the highest level of all the antenna subsets from the zeroth level antenna subset S[0,1] to the fourth level antenna subsets S[4,1] to S[4,12] (FIG. 1), the processor 130 may decide not to iterate step 605 again, and may proceed to step 613.

As shown in FIG. 7*c*, at step 613 of the third iteration, assuming that each of the parameter evaluations P[2,1], P[3,1] and P[4,1] associated with the antenna subsets S[2,1], S[3,1] and S[4,1] in the candidate pool rxCP meets the reception operation requirement(s), then the processor 130 may select the antenna subset S[4,1] from the antenna subsets S[2,1], S[3,1] and S[4,1] because the antenna count (equal to 1) of the antenna subset S[4,1] is lower than the antenna counts (equal to 4 and 2 respectively) of the antenna subsets S[2,1] and S[3,2]. Then the processor 130 may cause the UE 10 to use the antenna a[1] included in the antenna subset S[4,1], along with the cooperating RF circuit rfc[1] weighted by the weighting rxw[4,1,1] included in the weighting vector rxV[4,1], for subsequent wireless communication (e.g., reception); rest antennas a[2] to a[12] and rest RF circuits rfc[2] to rfc[16] may not be used, and the UE 10 may therefore reduce power consumption.

To sum up, the invention may provide a method (e.g., the flowchart 400 and/or 600 in FIGS. 4 and/or 6), a UE and/or a processor which may hierarchically and adaptively select fewer antennas from all antennas in an antenna set (e.g., array) for wireless communication, such as transmission (e.g., for uplink) and/or reception (e.g., for downlink), and may therefore effectively reduce power consumption of wireless communication. In an embodiment, the method according to the invention may be automatically executed by the UE (e.g., the processor) without intervention, attendance and/or awareness of user. During antenna selection, the invention may determine whether an antenna subset (e.g., S[i,j] in FIG. 4 or 6) could be selected according to associated quality evaluation (e.g., Q[i,j]) and/or parameter evaluation (e.g., P[i,j]), and may therefore ensure that the antenna selection will not degrade communication quality, and/or will not compromise compliance to operation requirement(s) which may relate to regulation(s) and/or demand(s) of protocol(s), technical specification(s) and/or standard(s) of wireless communication. The method according to the invention may cover a beamforming process (e.g., step 401 in FIG. 4 or 6), a transmission antenna preliminary selection procedure (e.g., 480 in FIG. 4), a transmission antenna advanced selection step (e.g., step 413 in FIG. 4), a reception antenna preliminary selection procedure (e.g., 680 in FIG. 6), and a reception antenna advanced selection step (e.g., step 613 in FIG. 6). In an embodiment, the UE may perform the beamforming process based on only one pilot (occupying one or more sequential symbols) to calculate the channel estimations (e.g., ch[1] to ch[N] at step 401 in FIG. 4 or 6) and/or the weighting vector(s) (e.g., txV0 and/or rxV0 at step 401 in FIG. 4 or 6) solved under a condition that all the antennas in the antenna set are used, then the UE (the processor) may execute the transmission and reception antenna preliminary selection procedures based on results (the channel estimations and/or the weighting vector(s)) of the beamforming process. As an example, the UE (processor) may apply the antenna selection of the invention to measurement of radio resource management (RRM) by selecting one or more antennas to receive and measure one or more signal blocks, wherein each signal block may include synchronization signal (SS) and physical broadcast channel (PBCH) signal packed as an SS/PBCH block (SSB), as defined by third generation partnership project (3GPP); since the antenna selection according to the invention is based on the channel estimations resulting from the beamforming process, the antenna selection according to the invention may ensure robustness of the RRM measurement.

The antenna selection (e.g., the transmission antenna selection procedure) according to the invention may select to use fewer than all antennas (and fewer than all cooperating RF circuits) for data transmission (e.g., uplink), and may therefore reduce transmission power consumption of the UE without affecting user experience, e.g., without suffering uplink throughput loss, and/or without compromising compliance to operation requirement(s) such as transmission power requirement(s) and/or radiation exposure regulation(s). The antenna selection (e.g., the reception antenna selection procedure) according to the invention may select to use fewer than all antennas (and fewer than all cooperating RF circuits) for data reception (e.g., downlink) dynamically and adaptively based on channel quality, receiving quality, throughput, runtime power consumption, whether downlink data transmission type is dense or sparse, and/or type of current user/system software application(s), e.g., whether each user/system application involves intense web activity (e.g., video and/or audio streaming, etc.) or moderate web activity (e.g., internet browsing and/or text messaging, etc.), and may therefore reduce reception power consumption of the UE without affecting user experience, e.g., without suffering downlink throughput loss. For example, when channel quality degrades, downlink data is dense, and/or one or more currently running applications require intense web activity, the antenna selection according to the invention may select to use more antennas (and more cooperating RF circuits); on the other hand, when channel quality improves, downlink data is sparse, and/or currently running applications only need low web activity, the antenna selection according to the invention may select to use fewer antennas (and fewer cooperating RF circuits).

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for antenna selection of a user equipment (UE); the UE comprising a plurality of antennas for wireless communication, the method being executed by the UE, and the method comprising:
   executing a quality evaluation step which comprises:
      calculating one or more quality evaluations respectively associated with one or more first antenna subsets; and
   executing a preliminary selection step which comprises:
      selecting one of the one or more first antenna subsets according to the one or more quality evaluations; and
   before the quality evaluation step, executing a weighting construction step which comprises: constructing one or more present-level weighting vectors respectively associated with the one or more first antenna subsets, wherein:
   each of the one or more first antenna subsets includes one or more of the plurality of antennas;
   each of the one or more present-level weighting vectors, being associated with one of the one or more first antenna subsets, includes one or more present-level weightings respectively associated with the one or more of the plurality of antennas included in the associated first antenna subset; and
   each of the one or more quality evaluations, being associated with one of the one or more first antenna subsets, is calculated under a condition that the one or more of the plurality of antennas included in the associated first antenna subset, being respectively weighted by the one or more present-level weightings included in the associated present-level weighting vector, are used to communicate.

2. The method of claim 1 further comprising:
   before the quality evaluation step, calculating a plurality of channel estimations respectively associated with the plurality of antennas; wherein:
   when calculating the one or more quality evaluations at the quality evaluation step, calculating the one or more quality evaluations based on the plurality of channel estimations.

3. The method of claim 1, wherein:
   when constructing a certain present-level weighting vector of the one or more present-level weighting vectors which is associated with a certain first antenna subset of the one or more first antenna subsets, fetching one or more previous weightings, and setting the one or more present-level weightings included in the certain resent-level weighing vectors according to the one or more previous weightings; and
   the one or more previous weightings are associated with the one or more of the plurality of antennas included in the certain first antenna subset, and are recorded before the weighting construction step.

4. The method of claim 1, wherein:
when constructing a certain present-level weighting vector of the one or more present-level weighting vectors which is associated with a certain first antenna subset of the one or more first antenna subsets, calculating the one or more present-level weightings included in the certain present-level weighting vector by solving a beamforming optimization problem under a condition that the one or more of the plurality of antennas included in the certain first antenna subset are used.

5. The method of claim 1, wherein each of the one or more quality evaluations comprises one or more communication qualities which relate to one or more of the following:
reference signal received power (RSRP);
reference signal received quality (RSRQ);
received signal strength indicator (RSSI); and
signal to interference and noise ratio (SINR).

6. The method of claim 1, wherein two of the one or more first antenna subsets are mutually exclusive.

7. A method for antenna selection of a user equipment (UE); the UE comprising a plurality of antennas for wireless communication, the method being executed by the UE, and the method comprising:
executing a quality evaluation step which comprises:
calculating one or more quality evaluations respectively associated with one or more first antenna subsets;
executing a preliminary selection step which comprises:
selecting one of the one or more first antenna subsets according to the one or more quality evaluations; and
executing an advanced selection step after executing the preliminary selection step; wherein:
each of the one or more first antenna subsets includes one or more of the plurality of antennas;
each of the one or more quality evaluations, being associated with one of the one or more first antenna subsets, is calculated under a condition that the one or more of the plurality of antennas included in the associated first antenna subset are used to communicate; and
the advanced selection step comprises:
from a candidate pool which comprises one or more second antenna subsets, selecting one of the one or more second antenna subsets according to one or more parameter evaluations;
wherein the one or more parameter evaluations are associated with the one or more second antenna subsets respectively, and each of the one or more second antenna subsets includes one or more of the plurality of antennas; and
wherein the preliminary selection step further comprises:
after selecting the one of the one or more first antenna subsets according to the one or more quality evaluations, including the selected one of the one or more first antenna subsets in the candidate pool.

8. The method of claim 7, wherein the method further comprises:
before the advanced selection step, calculating the one or more parameter evaluations respectively associated with the one or more second antenna subsets; each of the one or more parameter evaluations, being associated with one of the one or more second antenna subsets, comprising one or more parameters of the UE, and being calculated under a condition that the one or more of the plurality of antennas included in the associated one of the one or more second antenna subset are used to communicate.

9. The method of claim 7, wherein selecting the one of the one or more second antenna subsets according to the one or more parameter evaluations comprises:
picking one or more compliant antenna subsets from the one or more second antenna subsets by: picking a certain second antenna subset of the one or more second antenna subsets as one of the one or more compliant antenna subsets if a certain parameter evaluation of the one or more parameter evaluations, which is associated with the certain second antenna subset, meets one or more operation requirements; and
selecting one of the one or more compliant antenna subsets according to one or more counts respectively associated with the one or more compliant antenna subsets;
wherein each of the one or more counts, being associated with one of the one or more compliant antenna subsets, relates to a count of the one or more antennas included in the associated one of the one or more compliant antenna subsets.

10. The method of claim 9, wherein the one or more operation requirements relate to one or more of the following:
maximum power reduction (MPR);
power management maximum power reduction (P-MPR);
error vector magnitudes (EVM); and
time-averaged power density.

11. The method of claim 9, wherein:
when selecting one of the one of more compliant antenna subsets according to the one or more counts respectively associated with the one or more compliant antenna subsets, selecting a said compliant antenna subset which is associated with the lowest count among the one or more compliant antenna subsets.

12. The method of claim 9 further comprising:
after selecting the one of the one or more compliant antenna subsets, causing the UE to use the one or more of the plurality of antennas included in the selected one of the one or more compliant antenna subsets for subsequent communication.

13. The method of claim 12 further comprising:
when causing the UE to use the one or more of the plurality of antennas included in the selected one of the one or more compliant antenna subsets for subsequent communication, further causing the UE not to use rest of the plurality of antennas.

14. The method of claim 7, wherein:
each of the one or more parameter evaluations, being associated with one of the one or more second antenna subsets, relates to power of one or more power amplifiers coupled to the one or more of the plurality of antennas included in the associated one of the one or more second antenna subsets.

15. A method for antenna selection of a user equipment (UE); the UE comprising a plurality of antennas for wireless communication, the method being executed by the UE, and the method comprising:
executing a quality evaluation step which comprises:
calculating one or more quality evaluations respectively associated with one or more first antenna subsets;
executing a preliminary selection step which comprises:
selecting one of the one or more first antenna subsets according to the one or more quality evaluations; and
after selecting the one of the one or more first antenna subsets according to the one or more quality evaluations, iterating the quality evaluation step and the preliminary selection step by:

calculating one or more next-level quality evaluations respectively associated with one or more next-level antenna subsets; and according to the one or more next-level quality evaluations, selecting one of the one or more next-level antenna subsets; wherein:

each of the one or more first antenna subsets includes one or more of the plurality of antennas;

each of the one or more next-level antenna subsets includes one or more of the plurality of antennas;

each of the one or more quality evaluations, being associated with one of the one or more first antenna subsets, is calculated under a condition that the one or more of the plurality of antennas included in the associated first antenna subset are used to communicate;

each of the one or more next-level quality evaluations, being associated with one of the one or more next-level antenna subsets, is calculated under a condition that the one or more of the plurality of antennas included in the associated next-level antenna subset are used to communicate; and a count of the one or more of the plurality of antennas included in each of the one or more next-level antenna subsets is not greater than a count of the one or more of the plurality of antennas included in the selected one of the one or more first antenna subsets.

16. The method of claim 15, wherein at least one of the one or more next-level antenna subsets is a strict subset of the selected one of the one or more first antenna subset.

17. The method of claim 15 further comprising:

monitoring one or more reception qualities; and before iterating the quality evaluation step and the preliminary selection step, determining whether to iterate the quality evaluation step and the preliminary selection step according to the one or more reception qualities.

18. A method for antenna selection of a user equipment (UE); the UE comprising a plurality of antennas for wireless communication, the method being executed by the UE, and the method comprising:

executing a quality evaluation step which comprises:
calculating one or more quality evaluations respectively associated with one or more first antenna subsets;

executing a preliminary selection step which comprises:
selecting one of the one or more first antenna subsets according to the one or more quality evaluations;

monitoring one or more reception qualities; and before executing the quality evaluation step and the preliminary selection step, determining whether to execute the quality evaluation step and the preliminary selection step according to the one or more reception qualities; wherein:

each of the one or more first antenna subsets includes one or more of the plurality of antennas; and each of the one or more quality evaluations, being associated with one of the one or more first antenna subsets, is calculated under a condition that the one or more of the plurality of antennas included in the associated first antenna subset are used to communicate.

19. The method of claim 18, wherein the one or more reception qualities relate to one or more of the following:

channel quality;

receiving quality;

throughput;

runtime power consumption;

whether downlink data transmission type is dense or sparse; and type of current user application.

* * * * *